(12) United States Patent
Kawano

(10) Patent No.: US 11,729,259 B2
(45) Date of Patent: Aug. 15, 2023

(54) IMPROVING RESOURCE EFFICIENCY IN AN IMAGE PROCESSING SYSTEM FOR PROCESSING A MOVING IMAGE OR A STILL FRAME

(71) Applicant: FUJITSU LIMITED, Kawasaki (JP)

(72) Inventor: Miho Kawano, Hamamatsu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/880,696

(22) Filed: Aug. 4, 2022

(65) Prior Publication Data

US 2022/0377138 A1 Nov. 24, 2022

Related U.S. Application Data

(63) Continuation of application No. PCT/JP2020/014813, filed on Mar. 31, 2020.

(51) Int. Cl.
*G06F 15/173* (2006.01)
*H04L 67/1008* (2022.01)
*H04L 67/1038* (2022.01)

(52) U.S. Cl.
CPC ...... *H04L 67/1008* (2013.01); *H04L 67/1038* (2013.01)

(58) Field of Classification Search
CPC .................. H04L 67/1008; H04L 67/1038
USPC ......................................................... 709/226
See application file for complete search history.

(56) References Cited

U.S. PATENT DOCUMENTS

| 7,558,701 B2* | 7/2009 | Andarawis | G05B 23/0221 |
| | | | 702/183 |
| 8,781,001 B2* | 7/2014 | Sasai | H04N 19/91 |
| | | | 375/240.25 |
| 9,407,838 B2* | 8/2016 | Butte | A61B 1/0669 |
| 9,414,057 B2* | 8/2016 | Terada | H04N 19/21 |
| 9,571,747 B2* | 2/2017 | Ono | G03B 15/05 |
| 9,749,623 B2* | 8/2017 | Sasai | H04N 19/70 |
| 9,894,352 B2* | 2/2018 | Terada | H04N 19/90 |
| 9,967,560 B2* | 5/2018 | Sasai | H04N 19/91 |

(Continued)

FOREIGN PATENT DOCUMENTS

JP H10-285588 A 10/1998
JP 2015-132887 A 7/2015

(Continued)

OTHER PUBLICATIONS

International Search Report and Written Opinion of the International Searching Authority (Form PCT/ISA/210, 220, and 237), mailed in connection with PCT/JP2020/014813 and dated Jul. 7, 2020 (Total 10 pages).

*Primary Examiner* — Alicia Baturay
(74) *Attorney, Agent, or Firm* — Fujitsu Patent Center

(57) ABSTRACT

An image processing control device includes: a memory; and a processor coupled to the memory and configured to: determine, on a basis of a processing rate of an image processing program to be deployed, a type of transfer data extracted from video at a time of transferring the video to be processed by the image processing program to be deployed to be a moving image or a still image; and select, on a basis of the type of the transfer data, a deployment destination information processing device to which the image processing program to be deployed is deployed from among a plurality of information processing devices.

15 Claims, 31 Drawing Sheets

(56) References Cited

U.S. PATENT DOCUMENTS

| | | | | |
|---|---|---|---|---|
| 10,142,624 B2* | 11/2018 | Terada | ............... | H04N 19/20 |
| 10,298,924 B2* | 5/2019 | Sasai | ............... | H04N 19/105 |
| 10,356,429 B2* | 7/2019 | Terada | ............... | H04N 19/132 |
| 10,567,758 B2* | 2/2020 | Sasai | ............... | H04N 19/91 |
| 10,652,557 B2* | 5/2020 | Terada | ............... | H04N 19/21 |
| 10,803,578 B2* | 10/2020 | Butte | ............... | H04N 23/51 |
| 10,893,282 B2* | 1/2021 | Terada | ............... | H04N 19/20 |
| 11,195,276 B2* | 12/2021 | Butte | ............... | A61B 1/043 |
| 11,544,895 B2* | 1/2023 | Bruns | ............... | G06T 15/10 |
| 2015/0195213 A1 | 7/2015 | Orita | | |
| 2017/0106530 A1* | 4/2017 | Shimokawa | ............... | G05B 19/042 |
| 2017/0262291 A1* | 9/2017 | Lai | ............... | G06F 9/50 |
| 2018/0349190 A1* | 12/2018 | Nakajima | ............... | G06F 9/5083 |
| 2022/0035684 A1* | 2/2022 | Gupte | ............... | G06F 9/5083 |
| 2022/0210454 A1* | 6/2022 | Gao | ............... | H04N 19/436 |

FOREIGN PATENT DOCUMENTS

| | | |
|---|---|---|
| JP | 2019-022205 A | 2/2019 |
| WO | 2020/004380 A1 | 1/2020 |

* cited by examiner

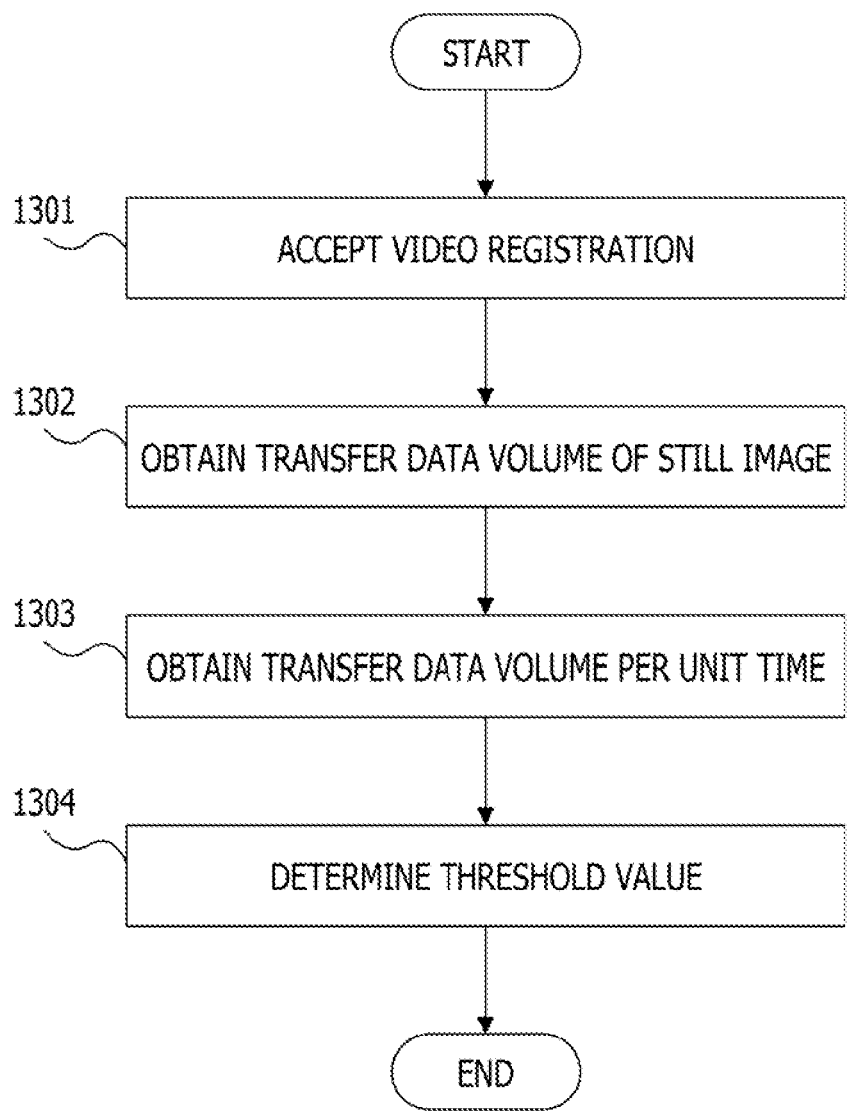

FIG. 18A

| APPLICATION | REQUEST PROCESSING RESOURCE [Core] | REQUEST TIME [s] | REQUEST PROCESSING RATE [fps] | PROCESSING TIME PER IMAGE [s] |
|---|---|---|---|---|
| A | 6 | 8 | 40 | 0.025 |
| B | 6 | 10 | 20 | 0.05 |

FIG. 18B

| APPLICATION | REQUEST PROCESSING RESOURCE [Core] | REQUEST TIME [s] | REQUEST PROCESSING RATE [fps] | PROCESSING TIME PER IMAGE [s] |
|---|---|---|---|---|
| C | 4 | 15 | 40 | 0.025 |

FIG. 19

| PROCESSING SERVER | TOTAL RESOURCE AMOUNT [Core] | FREE RESOURCE [Core] |
|---|---|---|
| PROCESSING SERVER 1002-2 | 8 | 2 |
| PROCESSING SERVER 1002-3 | 8 | 2 |

FIG. 20

| TRANSFER DESTINATION | MAXIMUM IMAGE RATE |
|---|---|
| PROCESSING SERVER 1002-2 | 40 |
| PROCESSING SERVER 1002-3 | 20 |

FIG. 21

| TRANSMISSION SOURCE | TRANSMISSION DESTINATION | BANDWIDTH [bps] |
|---|---|---|
| PROCESSING SERVER 1002-1 | PROCESSING SERVER 1002-2 | 1000Mbps |
| PROCESSING SERVER 1002-1 | PROCESSING SERVER 1002-3 | 1000Mbps |
| PROCESSING SERVER 1002-2 | PROCESSING SERVER 1002-3 | 1000Mbps |
| PROCESSING SERVER 1002-2 | DB SERVER 1003-1 | 1000Mbps |
| PROCESSING SERVER 1002-2 | DB SERVER 1003-2 | 1000Mbps |
| PROCESSING SERVER 1002-3 | DB SERVER 1003-1 | 1000Mbps |
| PROCESSING SERVER 1002-3 | DB SERVER 1003-2 | 1000Mbps |

FIG. 25A

| PROCESSING SERVER | ADDRESS | IMAGE RATE [fps] |
|---|---|---|
| PROCESSING SERVER 1002-4 | 192.168.0.40 | 20 |

FIG. 25B

| PROCESSING SERVER | ADDRESS | IMAGE RATE [fps] |
|---|---|---|
| PROCESSING SERVER 1002-4 | 192.168.0.40 | 40 |

FIG. 25C

| PROCESSING SERVER | ADDRESS | IMAGE RATE [fps] |
|---|---|---|
| PROCESSING SERVER 1002-4 | 192.168.0.40 | 40 |

FIG. 25D

| PROCESSING SERVER | ADDRESS | IMAGE RATE [fps] |
|---|---|---|
| PROCESSING SERVER 1002-4 | 192.168.0.40 | 20 |
| PROCESSING SERVER 1002-5 | 192.168.0.50 | 40 |

IMPROVING RESOURCE EFFICIENCY IN AN IMAGE PROCESSING SYSTEM FOR PROCESSING A MOVING IMAGE OR A STILL FRAME

CROSS-REFERENCE TO RELATED APPLICATION

This application is a continuation application of International Application PCT/JP2020/014813 filed on Mar. 31, 2020 and designated the U.S., the entire contents of which are incorporated herein by reference.

FIELD

The embodiment discussed herein is related to an image processing control technique.

BACKGROUND

In recent years, various types of image processing using video imaged by a camera have been performed. For example, examples of image processing using video in a factory include processing of detecting a person in the video, processing of counting the number of people in the video, processing of detecting work performed by a person in the video, processing of tracking a position of a tool or a part handled by a person in the video, and the like.

Japanese Laid-open Patent Publication No. 10-285588 is disclosed as related art.

SUMMARY

According to an aspect of the embodiments, an image processing control device includes: a memory; and a processor coupled to the memory and configured to: determine, on a basis of a processing rate of an image processing program to be deployed, a type of transfer data extracted from video at a time of transferring the video to be processed by the image processing program to be deployed to be a moving image or a still image; and select, on a basis of the type of the transfer data, a deployment destination information processing device to which the image processing program to be deployed is deployed from among a plurality of information processing devices.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a flowchart of a threshold value determination process;

FIGS. 18A and 18B are diagrams illustrating constraint conditions of the applications;

FIG. 19 is a diagram illustrating the processing resources of the processing servers;

FIG. 20 is a diagram illustrating image rates of the transfer data;

FIG. 21 is a diagram illustrating bandwidth between servers;

FIGS. 25A to 25D are diagrams illustrating update processing;

DESCRIPTION OF EMBODIMENTS

In relation to the image processing, there has been known an image communication terminal device that switches between a moving image codec and a still image codec by a user performing an operation of switching a frame rate in stages.

At a time of performing the image processing using video, an operation may be carried out in such a manner that an image processing program is deployed in one of a plurality of information processing devices (computers) on a communication network and video to be processed is transferred to the image processing program. In this case, it is desirable to determine a deployment destination of the image processing program in such a manner that traffic of the communication network is reduced while constraint conditions of the image processing program are satisfied.

In one aspect, the embodiment aims to select an information processing device that reduces traffic of a communication network as a deployment destination of an image processing program.

Hereinafter, an embodiment will be described in detail with reference to the drawings.

Figure 1:
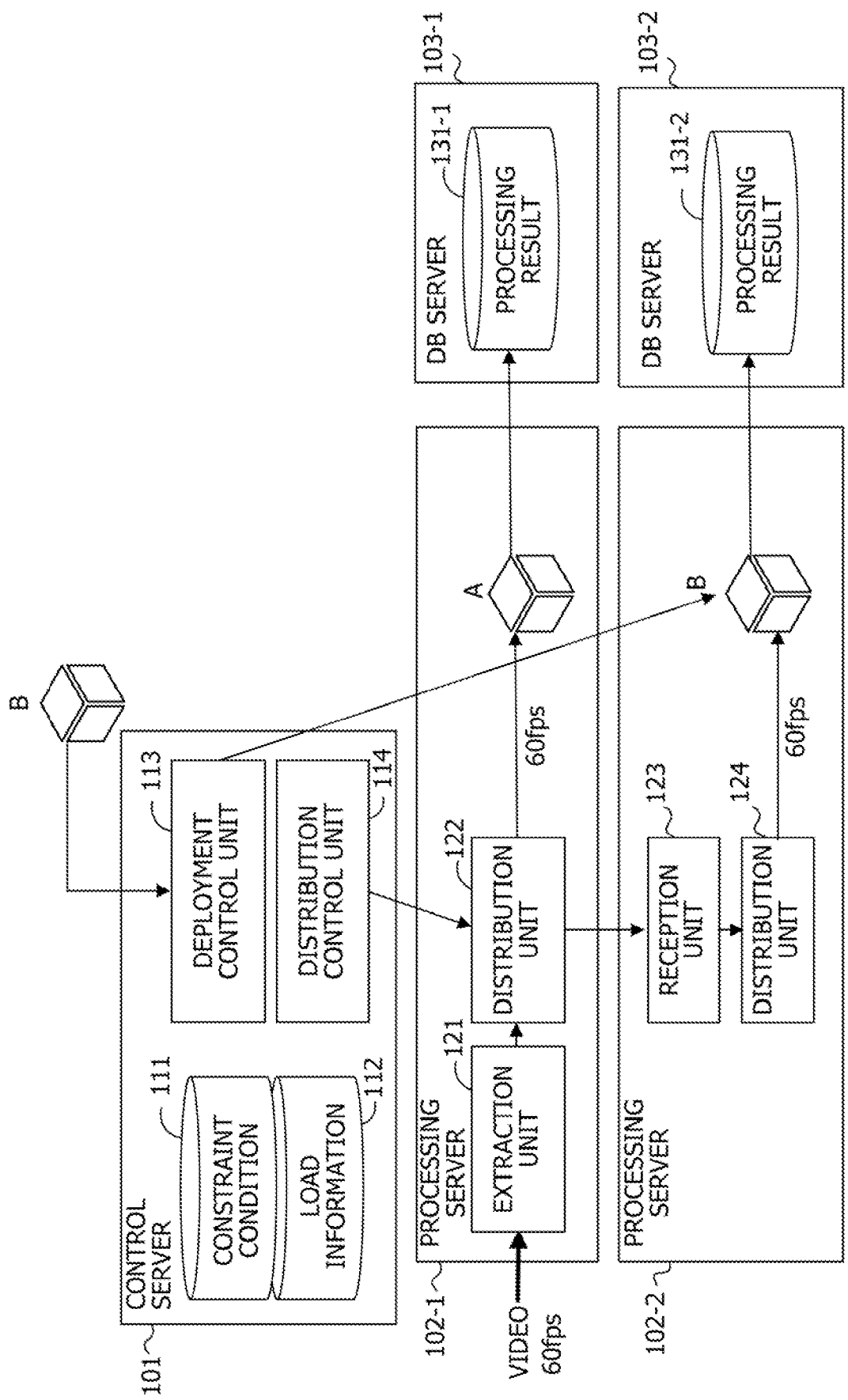
FIG. 1 is a diagram illustrating an image processing system.

FIG. 1 illustrates an exemplary image processing system that performs image processing on video. The image processing system of FIG. 1 includes a control server 101, a processing server 102-1, a processing server 102-2, a database (DB) server 103-1, and a DB server 103-2. Those servers are information processing devices, and are capable of communicating with each other via a communication network. The number of processing servers and DB servers included in the image processing system may be three or more.

The processing server 102-1 includes an extraction unit 121 and a distribution unit 122, and the processing server 102-2 includes a reception unit 123 and a distribution unit 124. Video to be input to the processing server 102-1 includes an image at each of a plurality of time points. The image at each time point may be called a frame. An application A is deployed in the processing server 102-1. The application A is an exemplary image processing program that processes video.

An image rate represents the number of images transferred or processed per unit time in the image processing system. The image rate may be called a frame rate. The image rate of the video to be input to the processing server 102-1 is 60 fps. A unit that expresses the number of frames per second is represented by fps.

The extraction unit 121 extracts transfer data of a moving image or a still image from the received video at the image rate and data volume instructed by the control server 101, and outputs the extracted transfer data to the distribution unit 122. The distribution unit 122 transfers the transfer data to the application A at the image rate instructed by the control server 101. In the example of FIG. 1, the image rate of the transfer data transferred to the application A is 60 fps.

The application A sequentially processes the transfer data received from the distribution unit 122, and transmits a processing result 131-1 to the DB server 103-1. The DB server 103-1 stores the processing result 131-1 received from the processing server 102-1.

The control server 101 stores a constraint condition 111 and load information 112, and includes a deployment control unit 113 and a distribution control unit 114. The constraint condition 111 is a constraint condition for each application deployed in the image processing system, and includes a request time and request processing resources. The load information 112 represents a usage status of the processing resources for each application. The processing resources are calculation resources such as a central processing unit (CPU), a memory, and the like of the processing server 102-1 and the processing server 102-2.

The request time represents the upper limit of the sum of a data transfer time and a processing time of the transfer data. The request time is an exemplary constraint condition related to the data transfer time and the processing time of the image processing program. The request processing resources represent processing resources to be used by the application to process the transfer data. The request processing resource is an exemplary constraint condition related to the processing resource of the image processing program.

Figure 2:
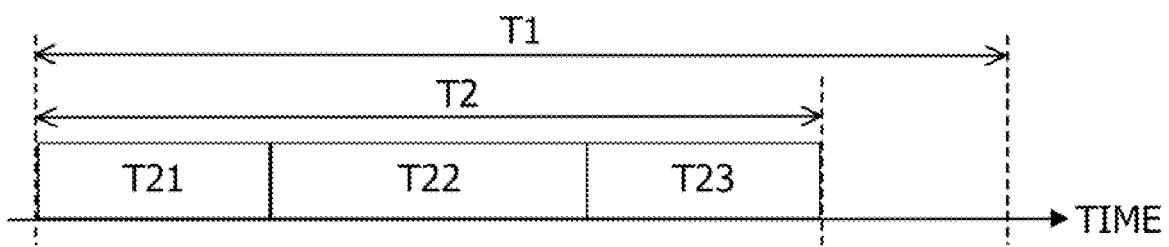
FIG. 2 is a diagram illustrating a request time.

FIG. 2 illustrates an exemplary request time. A data transfer time T21 represents a time for the distribution unit 122 to transfer, to the application A, the transfer data corresponding to the video per predetermined time. A processing time T22 represents a time for the application A to process the transfer data corresponding to the video per predetermined time. A data transfer time T23 represents a time for the application A to transfer, to the DB server 103-1, a processing result of the transfer data corresponding to the video per predetermined time.

The constraint condition of the request time is satisfied when the sum T2 of the data transfer time T21, the processing time T22, and the data transfer time T23 is equal to or less than the request time T1 of the application A.

The deployment control unit 113 accepts an application to be deployed from the outside, and deploys it to either the processing server 102-1 or the processing server 102-2. In this example, the application to be deployed is an application B. The application B performs image processing different from that of the application A using the same video as the application A.

In this case, the deployment control unit 113 selects, of the processing server 102-1 and the processing server 102-2, the processing server 102-2 that satisfies the constraint condition 111 of the application B as a deployment destination processing server. Then, the deployment control unit 113 deploys the application B to the processing server 102-2, and determines the image rate and the data volume of the transfer data to be transferred to the application B.

The distribution control unit 114 notifies the processing server 102-1 of the processing server 102-2 as a transfer destination of the transfer data. Moreover, the distribution control unit 114 notifies the processing server 102-1 of the image rate and the data volume of the transfer data. The extraction unit 121 of the processing server 102-1 extracts the transfer data from the video at the notified image rate and data volume, and the distribution unit 122 transfers the transfer data to the processing server 102-2 at the notified image rate. In the example of FIG. 1, the image rate of the transfer data transferred to the processing server 102-2 is 60 fps.

The reception unit 123 of the processing server 102-2 receives the transfer data from the processing server 102-1, and outputs it to the distribution unit 124. The distribution unit 124 transfers the transfer data to the application B at the image rate of 60 fps. As a result, the transfer data extracted from the same video is distributed to the application A and the application B.

The application B sequentially processes the transfer data received from the distribution unit 124, and transmits a processing result 131-2 to the DB server 103-2. The DB server 103-2 stores the processing result 131-2 received from the processing server 102-2.

However, it is difficult to effectively utilize the processing resources of the individual processing servers by simply distributing the transfer data to a plurality of applications.

Figure 3:
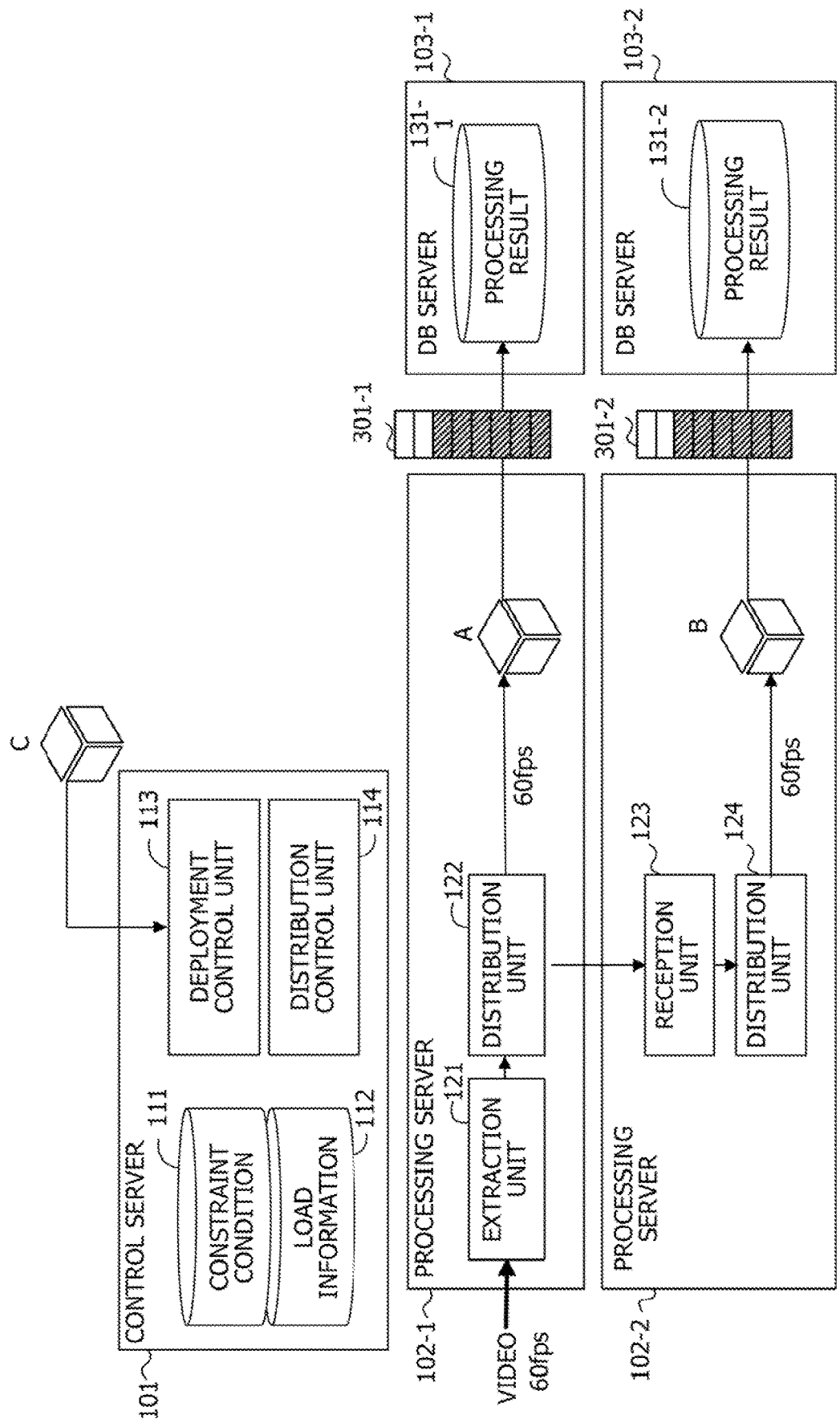
FIG. 3 is a diagram illustrating usage statuses of processing resources.

FIG. 3 illustrates an exemplary usage status of the processing resources when the application A and the application B are deployed in the image processing system of FIG. 1. A usage status 301-1 of the processing server 102-1 indicates that six cores of the eight cores included in the CPU are occupied. A usage status 301-2 of the processing server 102-2 also indicates that six cores of the eight cores included in the CPU are occupied.

In this case, since two cores are not used in each of the processing server 102-1 and the processing server 102-2, the free resources of the entire image processing system are four cores. In this state, the deployment control unit 113 accepts an application C to be deployed. The application C performs image processing different from that of the application A and application B using the same video as the application A and application B.

In a case where the request processing resource of the application C is four cores, the free resource of any processing server does not satisfy the constraint condition of the request processing resource, and thus no deployment destination processing server is found. Therefore, the application C is not deployed to any processing server, and the free resources of the individual processing servers are not utilized. In this case, the application capacity in the image processing system decreases. The application capacity represents the number of deployed applications per processing server.

Furthermore, in the image processing system of FIG. 1, the transfer data is transferred from the processing server 102-1 to the processing server 102-2 at the same image rate as the video, thereby increasing the traffic of the communication network. In view of the above, a method of adjusting a bit rate of the transfer data is conceivable. The bit rate is an exemplary transfer rate.

Figure 4:
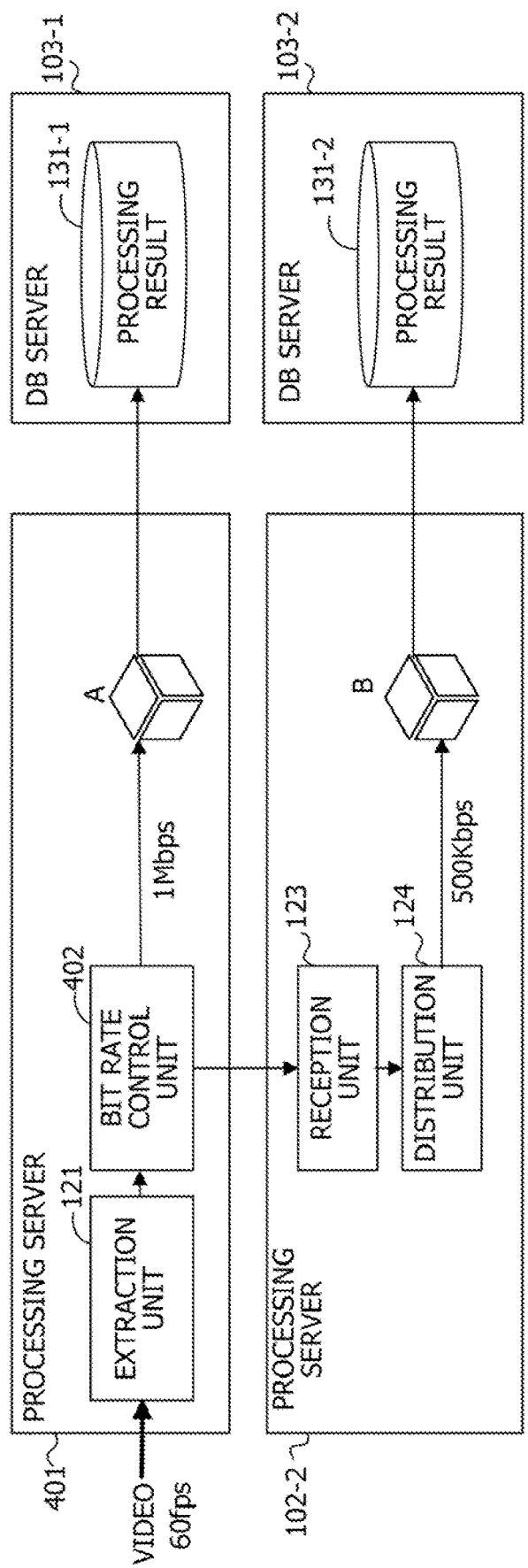
FIG. 4 is a diagram illustrating the image processing system that adjusts a bit rate.

FIG. 4 illustrates an example of the image processing system that adjusts the bit rate of the transfer data. The image processing system of FIG. 4 has a configuration in which the processing server 102-1 is replaced with a processing server 401 in the image processing system of FIG. 1. The control server 101 is omitted in FIG. 4.

The processing server 401 has a configuration in which the distribution unit 122 is replaced with a bit rate control unit 402 in the processing server 102-1 in FIG. 1. The bit rate control unit 402 reduces the bit rate of the transfer data in such a manner that the data volume of the transfer data transferred to each application is within the range that may be processed by the processing resources of each processing server and is within the bandwidth used by the communication network. Then, the bit rate control unit 402 transfers the transfer data to the application A and to the processing server 102-2.

In the example of FIG. 4, the bit rate of the transfer data transferred to the application A is set to 1 Mbps, and the bit rate of the transfer data transferred to the processing server 102-2 is reduced to 500 Kbps. As a result, it becomes possible to reduce the traffic of the communication network.

However, the resolution of the image processed by the application is lowered when the bit rate is reduced, which may affect the processing result of the application. Accordingly, it is not preferable to reduce the bit rate to obtain a highly accurate processing result. In view of the above, a method that deploys the same application to a plurality of processing servers and divides the transfer data into image units to parallelize the image processing is conceivable.

Figure 5:
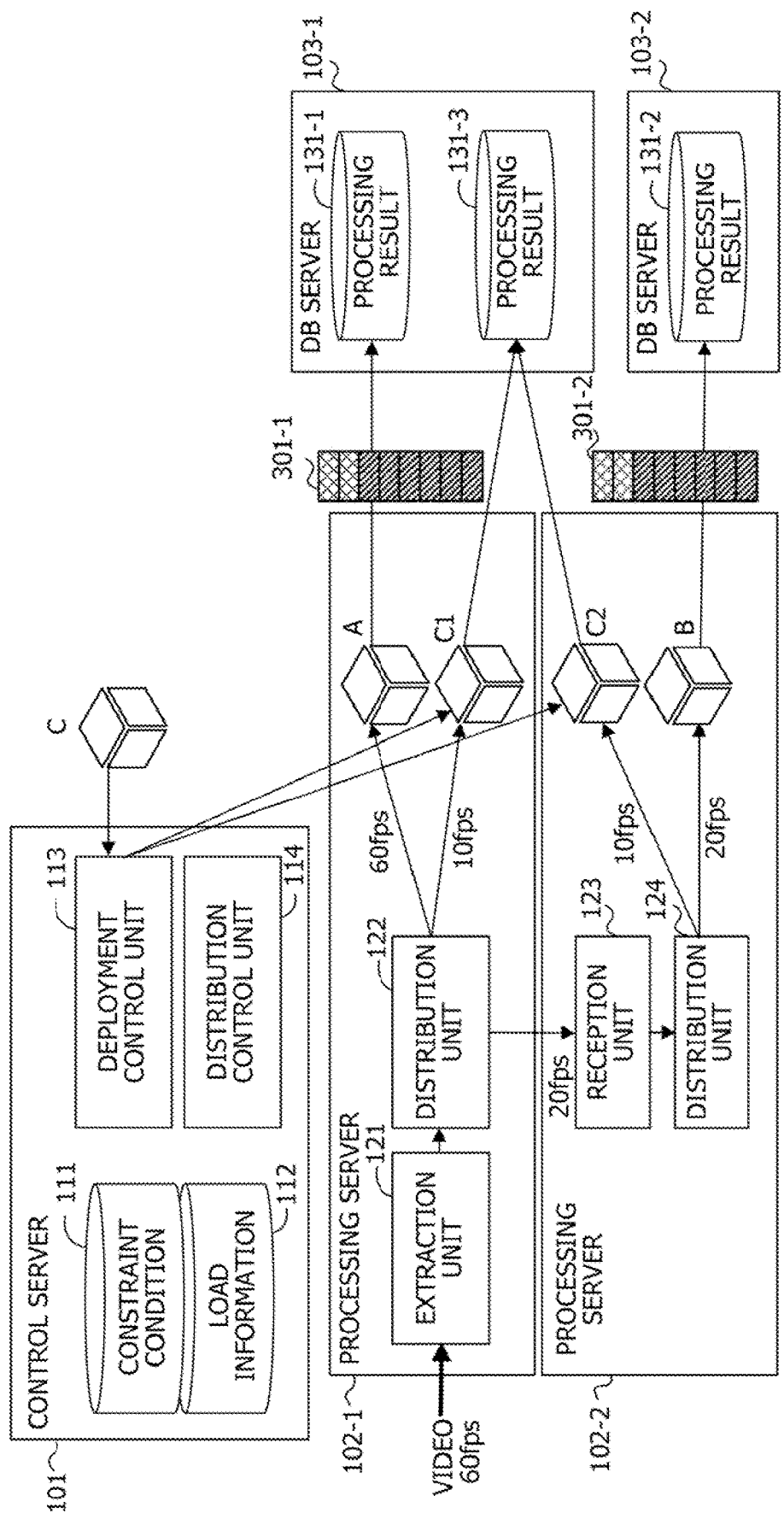
FIG. 5 is a diagram illustrating a deployment method for deploying applications to a plurality of processing servers.

FIG. 5 illustrates an exemplary deployment method of deploying an application to a plurality of processing servers in the image processing system of FIG. 1. In the state of the usage status 301-1 and the usage status 301-2 illustrated in FIG. 3, the deployment control unit 113 accepts the application C to be deployed.

Next, the deployment control unit 113 selects, as a deployment destination processing server, the processing server that satisfies the constraint condition of the request time in order from the processing server with the smallest transfer delay from the distribution unit 122. Then, the deployment control unit 113 secures the network resources and the processing resources of the deployment destination processing server, and deploys the application to the deployment destination processing server.

In the example of FIG. 5, the processing server 102-1 is the processing server with the lowest transfer delay from the distribution unit 122, and the processing server 102-2 is the processing server with the second smallest transfer delay from the distribution unit 122. Each of the processing server 102-1 and the processing server 102-2 has two cores as free resources.

In a case where the request processing resource of the application C is four cores, the deployment control unit 113 selects the processing server 102-1 and the processing server 102-2 as deployment destination processing servers, and secures the free resources of the individual processing servers as processing resources. Next, the deployment control unit 113 copies the application C to generate an application C1 and an application C2, deploys the application C1 to the processing server 102-1, and deploys the application C2 to the processing server 102-2.

Then, the deployment control unit 113 determines the processing rate of the application C1 and the application C2 according to the processing resources of the individual processing servers. The processing rate represents the number of images processed per unit time.

In the example of FIG. 5, the processing rate of the application C1 and the application C2 is determined to be 10 fps, and the image rate of the still image transferred from the processing server 102-1 to the processing server 102-2 is determined to be 20 fps.

The distribution control unit 114 notifies the processing server 102-1 of the processing server 102-1 and the processing server 102-2 as a transfer destination of the still image. Moreover, the distribution control unit 114 notifies the processing server 102-1 of the processing rate of the application C1 and the application C2 and the image rate of the still image transferred to the processing server 102-2.

The extraction unit 121 of the processing server 102-1 extracts the transfer data of the still image from the video at the image rate of 60 fps. The distribution unit 122 transfers the still image to the application A at the image rate of 60 fps. Furthermore, the distribution unit 122 transfers the still image to the application C1 at the image rate of 10 fps, and transfers the still image to the processing server 102-2 at the image rate of 20 fps.

The reception unit 123 of the processing server 102-2 receives the still image from the processing server 102-1, and outputs it to the distribution unit 124. The distribution unit 124 transfers the still image to the application C2 at the image rate of 10 fps, and transfers the still image to the application B at the image rate of 20 fps.

The still image transferred to the application C1 is, for example, an even-numbered image included in the video. The still image transferred to the application C2 is, for example, an odd-numbered image included in the video.

The application C1 sequentially processes the still image received from the distribution unit 122, and transmits a processing result to the DB server 103-1. The application C2 sequentially processes the still image received from the distribution unit 124, and transmits a processing result to the DB server 103-1. The DB server 103-1 stores the processing results of the application C1 and application C2 as a processing result 131-3.

According to the deployment method of FIG. 5, the video is divided into image units, and processed by the application C1 and the application C2 in parallel. As a result, the free resources of each processing server are effectively utilized, and the application capacity in the image processing system improves. Furthermore, the processing rate of the application C1 and the application C2 is determined according to the processing resources of each processing server, whereby the image rate of the transfer data may be reduced.

However, in the case of distributing the video in image units, the data volume of the still image may increase than that of the moving image depending on the processing rate of the extraction process for extracting the still image from the video, which may increase the load on the communication network.

Figure 6:
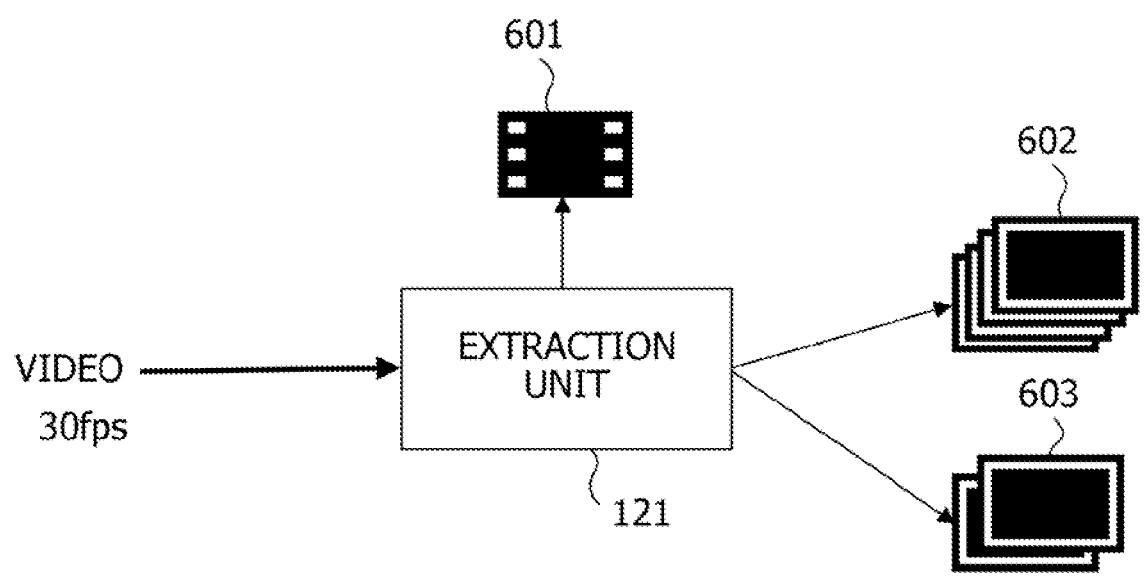
FIG. 6 is a diagram illustrating a moving image and still images extracted from video.

FIG. 6 illustrates an example of a moving image and still images extracted from the video. In a case where the image rate of the video to be input is 30 fps and the size of one image is 1,280×720 pixels, the data volume of an uncompressed moving image for 2 seconds with a format of yuv420p is 36,600 KB.

In a case where the transfer destination of the transfer data is the processing server 102-2, the extraction unit 121 extracts the uncompressed moving image for 2 seconds as moving image transfer data 601, still image transfer data 602, or still image transfer data 603. The transfer data 601 is compressed by video coding and transferred, and the transfer data 602 or the transfer data 603 is compressed by still image coding and transferred.

For example, the transfer data 601 is transferred as a compressed moving image of 30 fps in the MP4 format, and the data volume of the transfer data 601 is 516 KB. The transfer data 602 is transferred as a compressed still image of 10 fps in the joint photographic experts group (JPEG) format, and the data volume of the transfer data 602 is 721 KB. The transfer data 603 is transferred as a compressed still image of 5 fps in the JPEG format, and the data volume of the transfer data 603 is 476 KB.

In this case, while the data volume of the still image transfer data 603 is smaller than the data volume of the moving image transfer data 601, the data volume of the still image transfer data 602 is larger than the data volume of the moving image transfer data 601 by 40%.

As described above, depending on the processing rate of the extraction process, the data volume of the still image transfer data may be larger than the data volume of the moving image transfer data. Note that the data volume of the transfer data depends on a compression rate of the video, and the compression rate changes according to contents of the video.

In a case of transferring the video as a moving image, while the compression rate per unit time becomes higher, information of the image at previous time is used when restoring each image from the compressed moving image. Accordingly, the data volume of the transfer data is not reduced even when the image processing is parallelized, and the volume of the transfer data transferred in the communication network increases according to a degree of parallelism, thereby increasing the load on the communication network.

Furthermore, since the transfer to the application does not start until the compression of the moving image is complete, the latency time until the image processing start increases. Accordingly, the constraint condition of the processing rate may not be satisfied depending on the application. On the other hand, in a case of transferring the video as still images, it is possible to compress and transfer the images one by one, thereby shortening the latency time until the image processing start.

Figure 7:
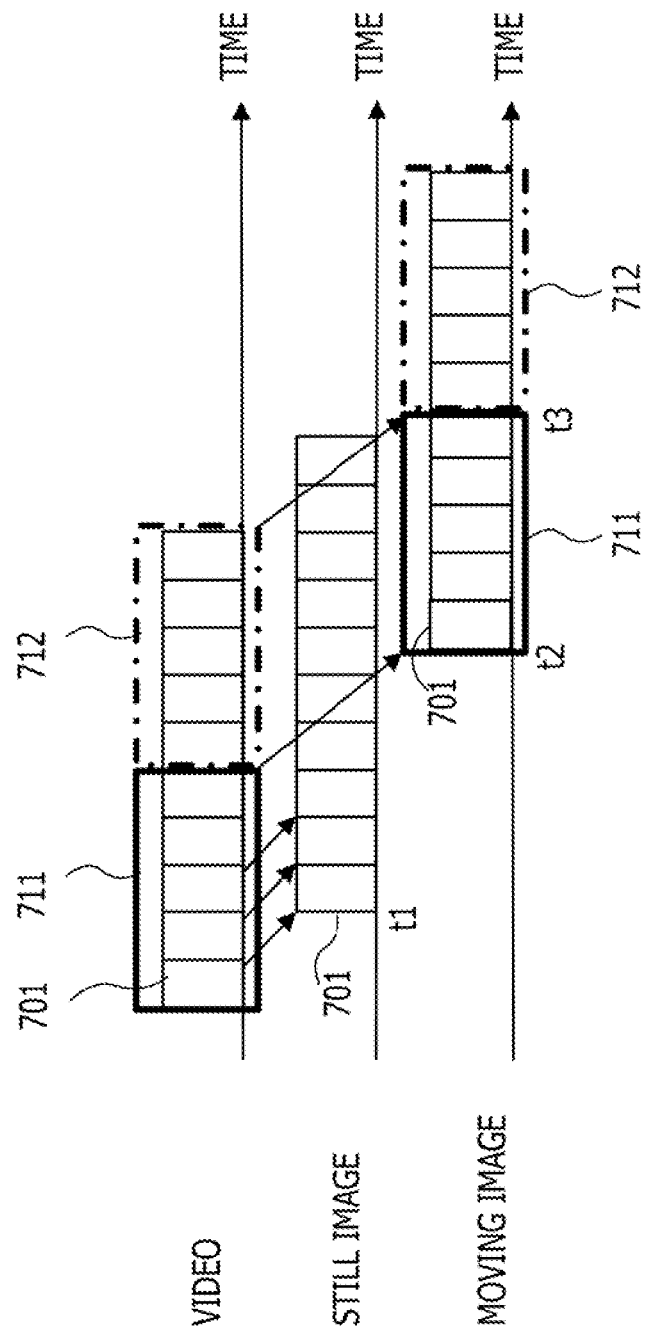
FIG. 7 is a diagram illustrating start time of image processing according to a type of transfer data.

FIG. 7 illustrates exemplary start time of the image processing according to a type of the transfer data. In a case of transferring each image 701 included in the video as a still image, encoding and decoding are carried out in image units, whereby the image processing by the application starts at time t1.

On the other hand, in a case of transferring, as a moving image, each of an image group 711 and an image group 712 including a predetermined number of images, which are included in the video, encoding and decoding are carried out in image group units. Accordingly, the image processing of the image group 711 starts at time t2 later than the time t1, and the image processing of the image group 712 starts at time t3.

Therefore, the image processing by the application may start earlier when the video is transferred as still images. However, as described above, the data volume of the transfer data is larger than a moving image depending on the processing rate of the extraction process. As described above, it is difficult to reduce the traffic of the communication network while satisfying the constraint condition of the processing rate of the application only by deploying the same application to a plurality of processing servers and parallelizing the image processing.

Figure 8:
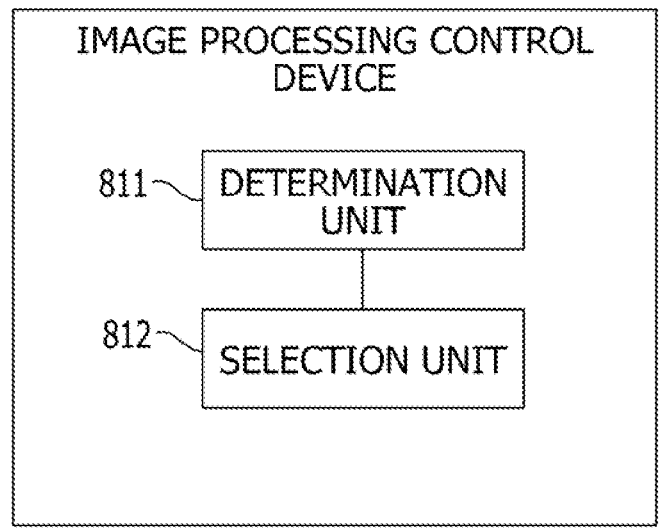
FIG. 8 is a functional configuration diagram of an image processing control device.

FIG. 8 illustrates an exemplary functional configuration of an image processing control device according to the embodiment. An image processing control device 801 of FIG. 8 includes a determination unit 811 and a selection unit 812.

Figure 9:
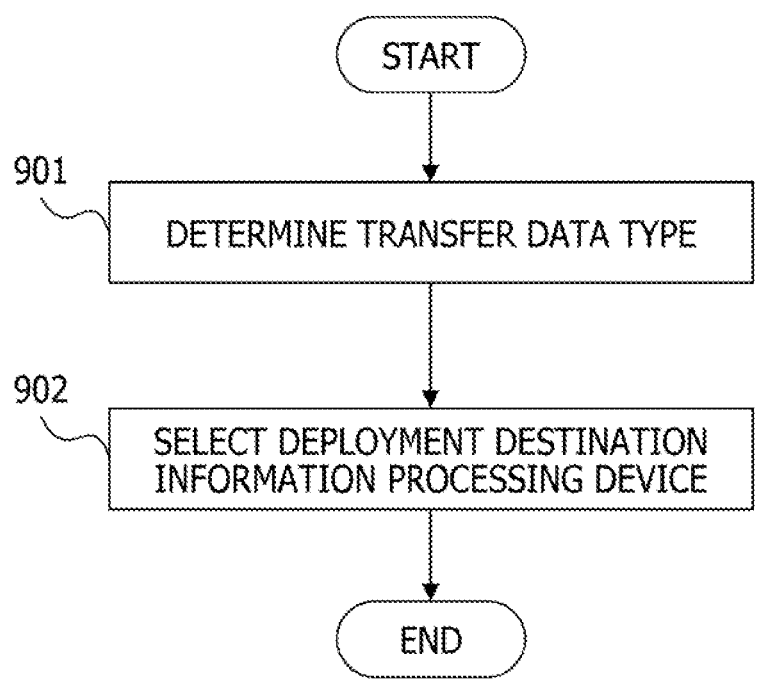
FIG. 9 is a flowchart of a control process.

FIG. 9 is a flowchart illustrating an exemplary control process performed by the image processing control device 801 of FIG. 8. First, the determination unit 811 determines a type of the transfer data extracted from the video at the time of transferring the video to be processed by the image processing program to be deployed to be a moving image or a still image on the basis of the processing rate of the image processing program to be deployed (step 901). Next, the selection unit 812 selects a deployment destination information processing device to which the image processing program to be deployed is deployed from among a plurality of information processing devices on the basis of the type of the transfer data (step 902).

According to the image processing control device 801 of FIG. 8, it becomes possible to select an information processing device that reduces the traffic of the communication network as a deployment destination of the image processing program.

Figure 10:
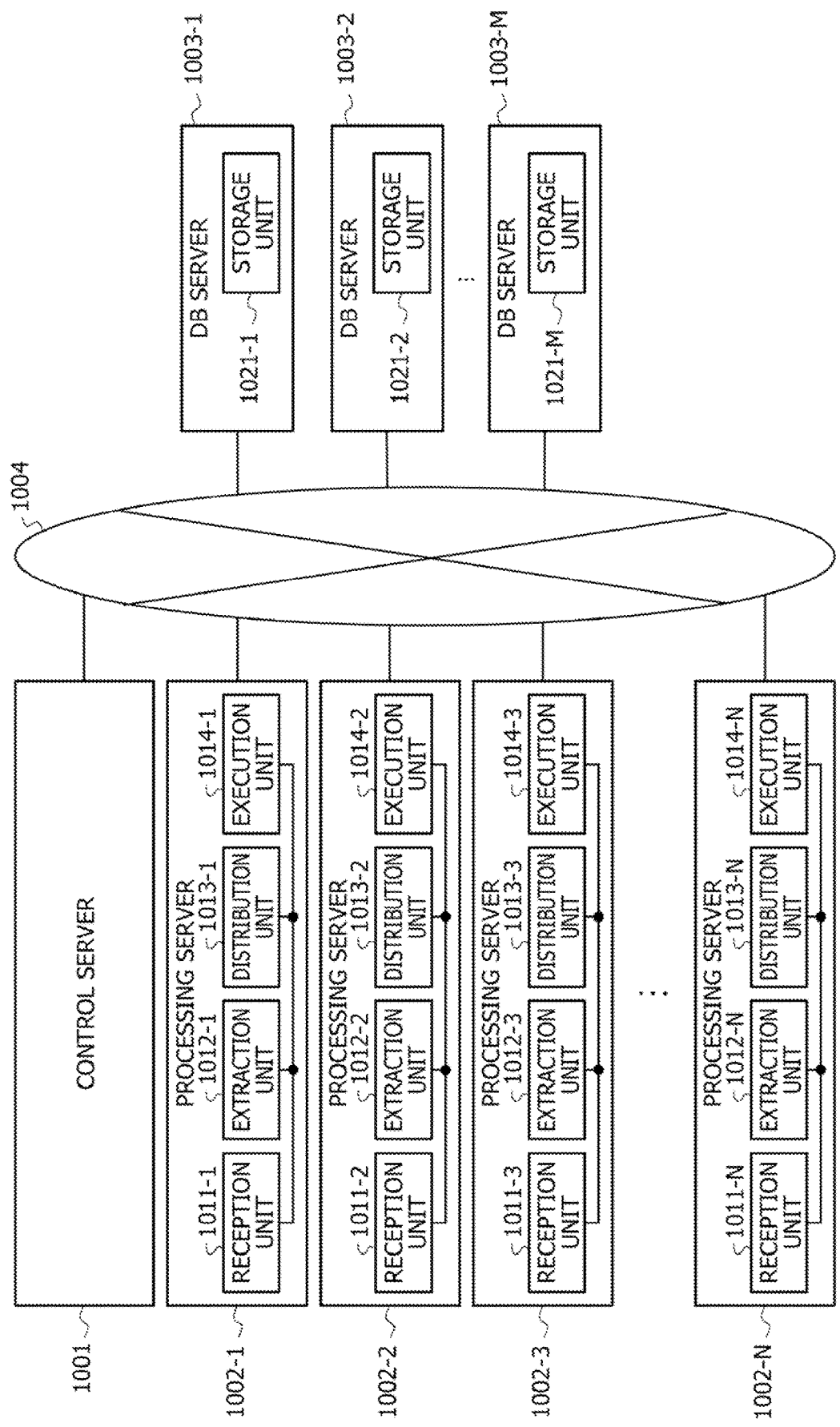
FIG. 10 is a functional configuration diagram of the image processing system.

FIG. 10 illustrates an exemplary functional configuration of the image processing system including the image processing control device 801 of FIG. 8. The image processing system of FIG. 10 includes a control server 1001, processing servers 1002-1 to 1002-N, and DB servers 1003-1 to 1003-M. N is an integer equal to or greater than 2, and M is an integer equal to or greater than 1.

Those servers are information processing devices, and are capable of communicating with each other via a communication network 1004. The communication network 1004 is, for example, a local area network (LAN) or a wide area network (WAN). The control server 1001 corresponds to the image processing control device 801 of FIG. 8.

A processing server 1002-$i$ ($i=1$ to N) includes a reception unit 1011-$i$, an extraction unit 1012-$i$, a distribution unit 1013-$i$, and an execution unit 1014-$i$. A reception unit 1011-1 of the processing server 1002-1 receives the video to be processed, and outputs it to an extraction unit 1012-1. The extraction unit 1012-1 extracts transfer data of a moving image or a still image from the video, and outputs the extracted transfer data to a distribution unit 1013-1.

The distribution unit 1013-1 transfers the transfer data to an execution unit 1014-1 or to another processing server 1002-$i$ (i=2 to N). In a case where the transfer destination is the execution unit 1014-1, the transfer data of the still image is transferred. In a case where the transfer destination is the another processing server 1002-$i$, the transfer data of the moving image or the still image is compressed by video coding or still image coding and transferred.

The execution unit 1014-1 executes the application deployed to the processing server 1002-1 to perform image processing on the still image, and transmits a processing result to one of DB servers 1003-$j$ (j=1 to M).

The reception unit 1011-$i$ of the processing server 1002-$i$ (i=2 to N) receives the transfer data from the processing server 1002-1, and decodes the received transfer data. In a case where the transfer data is a moving image, the reception unit 1011-$i$ outputs the transfer data to the extraction unit 1012-$i$. In a case where the transfer data is a still image, the reception unit 1011-$i$ outputs the transfer data to the distribution unit 1013-$i$.

The extraction unit 1012-$i$ extracts a still image from the moving image, and outputs it to the distribution unit 1013-$i$. The distribution unit 1013-$i$ outputs the still image output from the reception unit 1011-$i$ or the extraction unit 1012-$i$ to the execution unit 1014-$i$. The execution unit 1014-$i$ executes the application deployed to the processing server 1002-$i$ to perform image processing on the still image, and transmits a processing result to one of the DB servers 1003-$j$.

The DB server 1003-$j$ (j=1 to M) includes a storage unit 1021-$j$. The storage unit 1021-$j$ stores the processing result received from the processing server 1002-$i$ (i=1 to N).

The execution unit 1014-$i$ (i=1 to N) performs different image processing for individual applications, and generates different processing results for the individual applications. Examples of the image processing by the application may include processing of detecting a person in the image, processing of counting the number of people in the image, processing of detecting work performed by a person in the image, and processing of tracking a position of a tool or a part handled by a person in the image.

Figure 11:
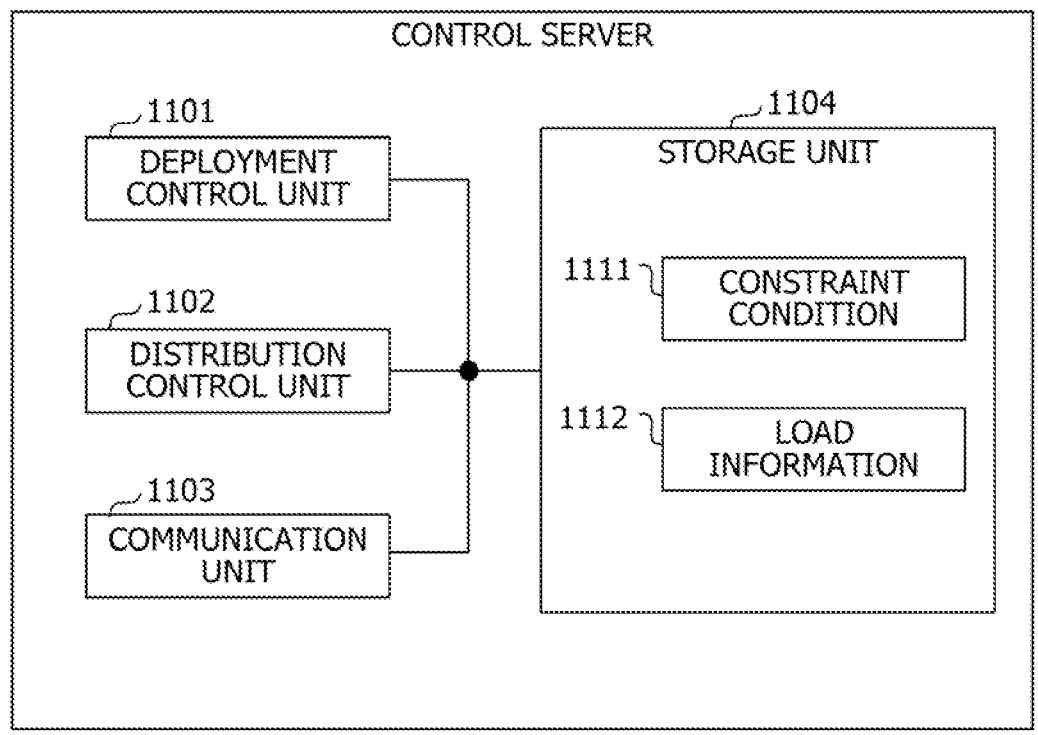
FIG. 11 is a functional configuration diagram of a control server.

FIG. 11 illustrates an exemplary functional configuration of the control server 1001 of FIG. 10. The control server 1001 of FIG. 11 includes a deployment control unit 1101, a distribution control unit 1102, a communication unit 1103, and a storage unit 1104. The storage unit 1104 stores a constraint condition 1111 and load information 1112. The deployment control unit 1101 corresponds to the determination unit 811 and the selection unit 812 in FIG. 8.

The constraint condition 1111 is a constraint condition for each application deployed in the image processing system, and includes a request processing rate, a request time, and request processing resources. The request processing rate represents the number of images processed by the application per unit time. The request processing rate is an exemplary constraint condition related to the processing rate of the image processing program.

As illustrated in FIG. 2, the request time represents the upper limit of the sum of the data transfer time and the processing time of the transfer data. The request processing resources represent processing resources to be used by the application to process the transfer data. The load information 1112 represents a usage status of the processing resources for each application.

The deployment control unit 1101 accepts the application to be deployed from the outside, and determines a type of the transfer data for the application to be deployed to be a moving image or a still image on the basis of the request processing rate of the application to be deployed. Then, the deployment control unit 1101 selects one of the processing servers 1002-$i$ as a deployment destination processing server on the basis of the determined type of the transfer data, and determines an image rate, data volume, and a processing rate of the extraction process of the transfer data.

The communication unit 1103 transmits the application to be deployed to the deployment destination processing server, and the deployment destination processing server installs the received application. As a result, the application to be deployed is deployed to the deployment destination processing server. The execution unit 1014-$i$ of the deployment destination processing server executes the deployed application.

The distribution control unit 1102 generates control information indicating a transfer destination, an image rate, data volume, and a processing rate of the extraction process of the transfer data for the application to be deployed, and the communication unit 1103 transmits the control information to the processing server 1002-1. As a result, the processing server 1002-1 is notified of the control information.

The extraction unit 1012-1 of the processing server 1002-1 extracts the transfer data from the video at the processing rate and data volume of the extraction process indicated by the control information, and outputs it to the distribution unit 1013-1. The distribution unit 1013-1 transfers the transfer data to the execution unit 1014-1 or another processing server 1002-$i$ at the image rate indicated by the control information.

The deployment control unit 1101 determines an application deployment method such that the communication load is reduced by utilizing the fact that the parallelization method that minimizes the transfer data volume differs between the case of transferring the video as a moving image and the case of transferring the video as a still image.

In the case where the transfer data is a moving image, since the transfer data volume increases as the degree of parallelism increases, the deployment control unit 1101 determines the maximum data volume that satisfies the constraint condition of the request time while lowering the degree of parallelism of the transfer. In the case where the transfer data is a still image, the deployment control unit 1101 parallelizes the image processing and distributes the transfer data in such a manner that the image rate of the transfer data for each processing server is made lower and the sum of the data amounts of the transfer data for a plurality of processing servers is made smaller.

Figure 12:
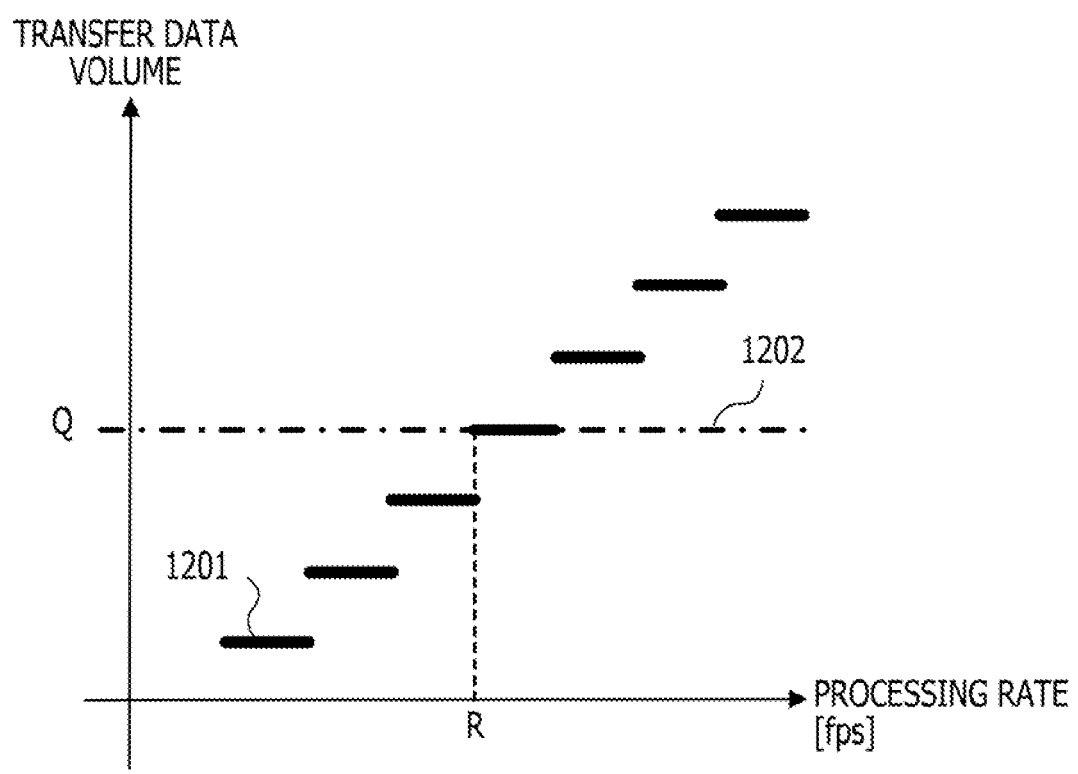
FIG. 12 is a diagram illustrating a relationship between an application processing rate and transfer data volume.

FIG. 12 illustrates an exemplary relationship between the application processing rate and the transfer data volume. The horizontal axis represents the application processing rate, and the vertical axis represents the transfer data volume per unit time. A plurality of segments 1201 in the horizontal direction represents the transfer data volume per unit time when the transfer data is a still image, and a dash-dotted line 1202 represents transfer data volume Q per unit time when the transfer data is a moving image.

The transfer data volume indicated by the segment 1201 increases as the processing rate increases, and the transfer data volume Q indicated by the dash-dotted line 1202 is constant regardless of the processing rate. In a case where the processing rate is smaller than a predetermined value R, the transfer data volume per unit time is smaller when the video is transferred as a still image than when it is transferred as a moving image. On the other hand, in a case where the processing rate is higher than the predetermined value R, the transfer data volume per unit time is smaller when the video is transferred as a moving image than when it is transferred as a still image.

Accordingly, the deployment control unit 1101 determines a type of the transfer data for the application to be deployed using the predetermined value R as a threshold value. The deployment control unit 1101 determines the transfer data to be a moving image when the request processing rate of the application is higher than the threshold value, and determines the transfer data to be a still image when the request processing rate is lower than the threshold value.

FIG. 13 is a flowchart illustrating an exemplary threshold value determination process performed by the control server 1001 of FIG. 10. First, the deployment control unit 1101 accepts registration of the video to be processed by the application to be deployed (step 1301).

Next, the deployment control unit 1101 obtains transfer data volume A per image included in the accepted video from the processing server 1002-1 (step 1302). Next, the deployment control unit 1101 obtains, from the processing server 1002-1, the transfer data volume Q per unit time in the case of transferring a plurality of images as a moving image (step 1303).

The extraction unit 1012-1 of the processing server 1002-1 extracts, from the video, a plurality of images included in a predetermined time range at a predetermined cycle, and calculates the transfer data volume A of the still image per extracted image. Furthermore, the extraction unit 1012-1 calculates the transfer data volume Q per unit time in the case of transferring the plurality of extracted images as a moving image. Then, the processing server 1002-1 notifies the control server 1001 of the transfer data volume A and the transfer data volume Q per unit time. As a result, the deployment control unit 1101 is enabled to obtain the transfer data volume A and the transfer data volume Q per unit time.

Next, the deployment control unit 1101 calculates the image rate of the still image corresponding to the transfer data volume Q by dividing the transfer data volume Q by the data volume A, and determines the calculated image rate as a threshold value (step 1304).

According to the threshold value determination process of FIG. 13, it becomes possible to determine, as a threshold value, the image rate at which the transfer data volume per unit time in the case of transferring the video as a still image is equal to the transfer data volume per unit time in the case of transferring the video as a moving image.

Figure 14A:
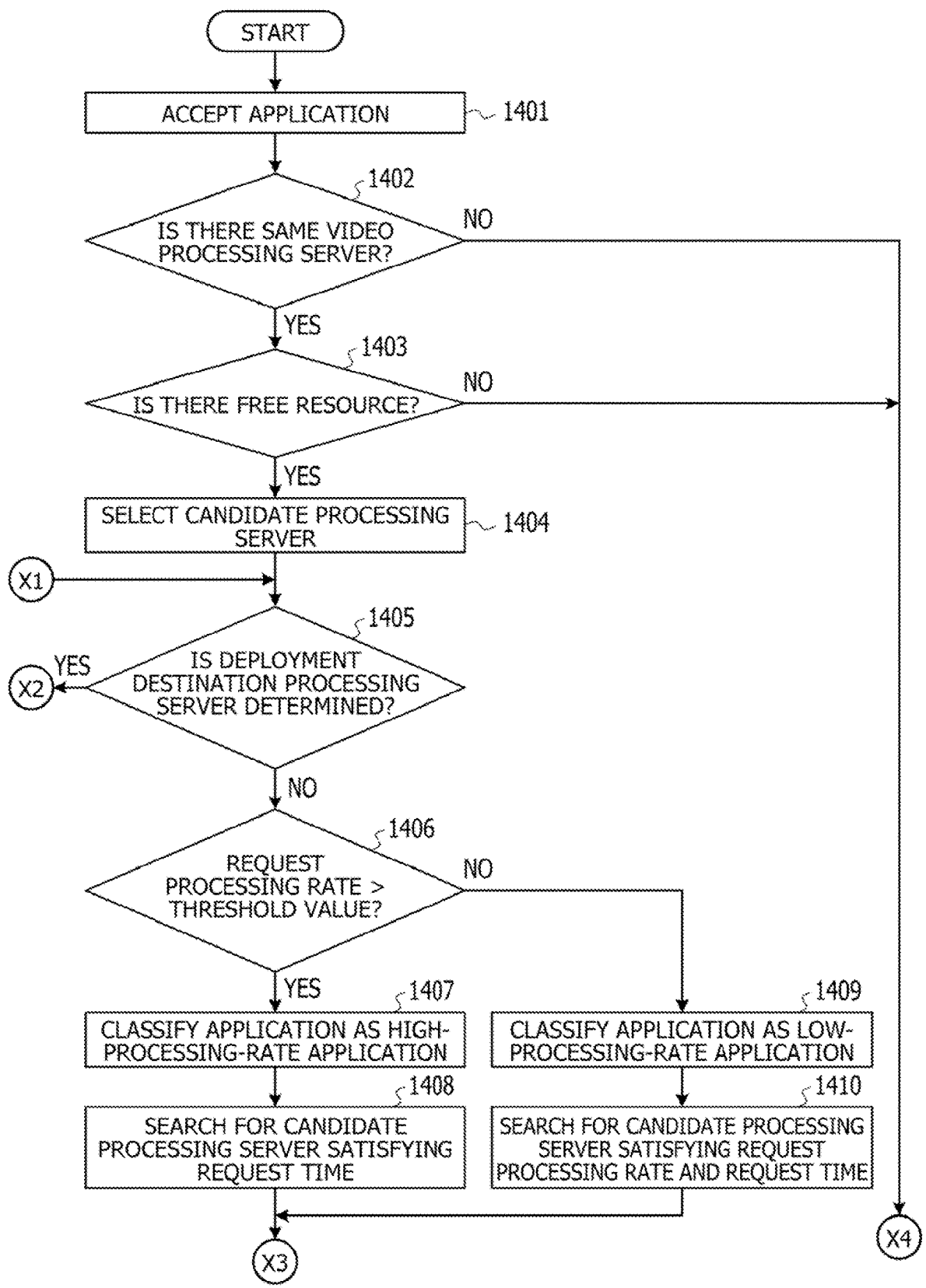
FIG. 14A is a flowchart (No. 1) of an application deployment process.
Figure 14B:
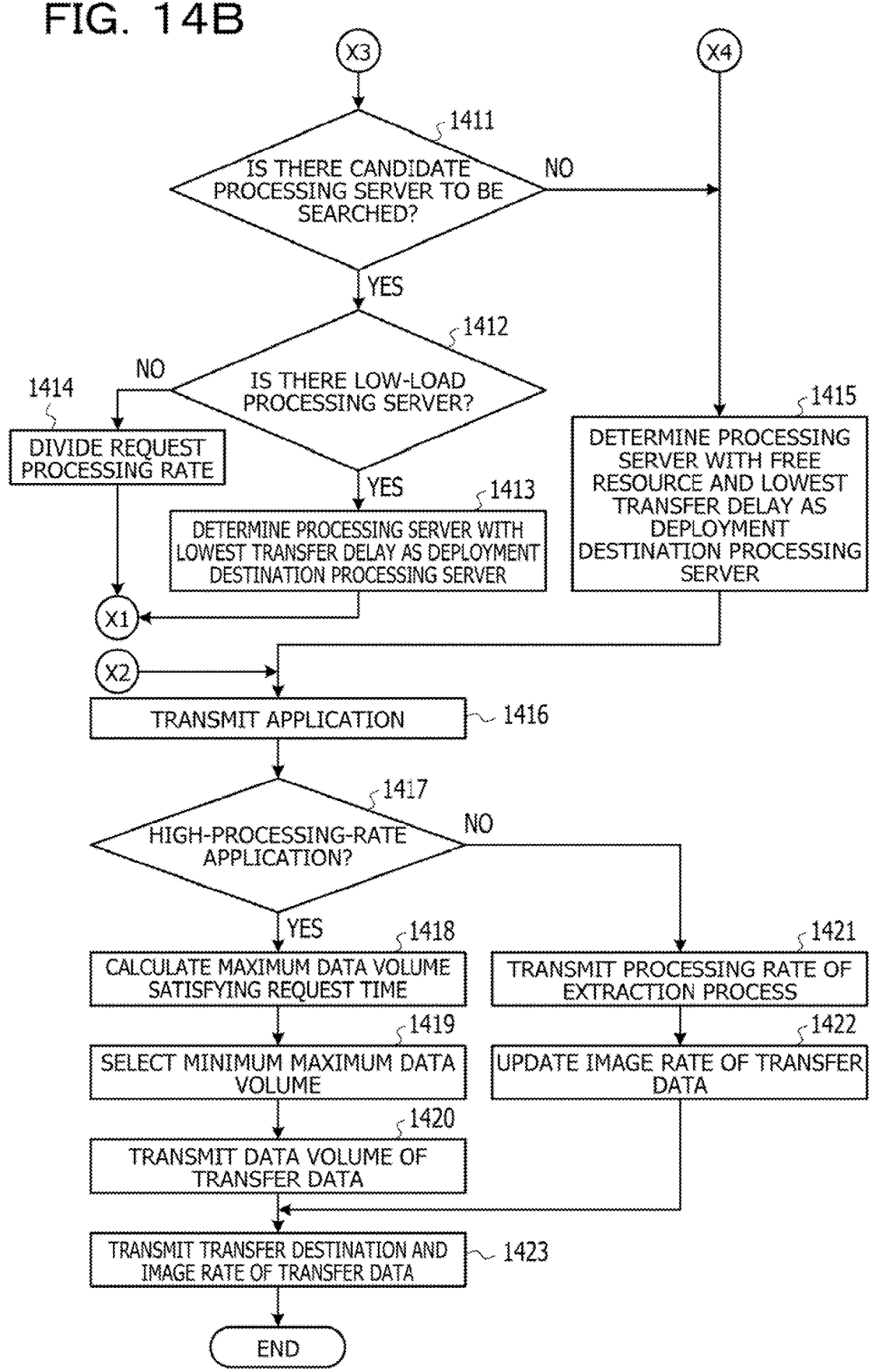
FIG. 14B is a flowchart (No. 2) of the application deployment process.

FIGS. 14A and 14B are flowcharts illustrating an exemplary application deployment process performed by the control server 1001 of FIG. 10. First, the deployment control unit 1101 accepts the application to be deployed (step 1401), and checks whether or not there is a same video processing server in the image system (step 1402). The same video processing server is the processing server 1002-i in which the application that processes the same video as the application to be deployed is deployed.

If there are one or more same video processing servers (YES in step 1402), the deployment control unit 1101 refers to the load information 1112 to check whether or not there are free resources in the same video processing server (step 1403).

If there are free resources in any of the same video processing servers (YES in step 1403), the deployment control unit 1101 selects one or more same video processing servers with free resources as candidate processing servers (step 1404).

With the same video processing server selected as a candidate processing server, it becomes possible to utilize the transfer data that has already been transferred, thereby suppressing an increase in traffic of the communication network 1004.

With the processing server 1002-i having free resources selected as a candidate processing server, it becomes possible to exclude the processing server 1002-i that uses all the processing resources from the candidates for the deployment destination processing server.

Next, the deployment control unit 1101 checks whether or not the deployment destination processing server that satisfies the constraint condition 1111 of the application to be deployed has been determined (step 1405). If the deployment destination processing server that satisfies the constraint condition 1111 has not been determined (NO in step 1405), the deployment control unit 1101 carries out the processing of step 1406. In step 1406, the deployment control unit 1101 compares the request processing rate of the application to be deployed with a threshold value of the video processed by the application to be deployed (step 1406).

If the request processing rate is higher than the threshold value (YES in step 1406), the deployment control unit 1101 classifies the application to be deployed as a high-processing-rate application (step 1407). The high-processing-rate application is an application in which the transfer data is transferred as a moving image.

Next, the deployment control unit 1101 searches the candidate processing servers in which the same video high-processing-rate application is deployed for a candidate processing server that satisfies the constraint condition of the request time of the application to be deployed (step 1408). Then, the deployment control unit 1101 checks whether or not there is a candidate processing server to be searched (step 1411).

The same video high-processing-rate application is a high-processing-rate application that processes the same video as the application to be deployed. In step 1408, a unit time is used as a predetermined time, and the sum of the data transfer time of the transfer data corresponding to the video per unit time and the data transfer time for transferring the processing result of the transfer data is calculated as a transfer delay. Then, if the transfer delay is equal to or less than the request time, it is determined that the constraint condition of the request time is satisfied.

If there is a candidate processing server to be searched (YES in step 1411), the deployment control unit 1101 checks whether or not there is a low-load processing server in the searched candidate processing servers (step 1412). The low-load processing server is the processing server 1002-i that satisfies the constraint condition of the request processing resources of the application to be deployed. If the free resources of the processing server 1002-i are equal to or more than the request processing resources, the constraint condition of the request processing resources is satisfied.

If there is a low-load processing server (YES in step 1412), the deployment control unit 1101 determines the processing server 1002-i with the lowest transfer delay among the low-load processing servers as a deployment destination processing server (step 1413). Then, the deployment control unit 1101 performs the process of step 1405 and subsequent steps.

With the candidate processing server in which the same video high-processing-rate application is deployed selected as a deployment destination processing server, it becomes possible to utilize the transfer data of the moving image that has already been transferred, thereby suppressing an increase in the degree of parallelism of the moving image transfer. As a result, the increase in traffic of the communication network 1004 is suppressed.

With the candidate processing server that satisfies the constraint condition of the request time selected as a deployment destination processing server, it becomes possible to satisfy the constraint condition of the request time of the application to be deployed.

With the low-load processing server selected as a deployment destination processing server, it becomes possible to satisfy the constraint condition of the request processing resources of the application to be deployed.

If the request processing rate is equal to or lower than the threshold value (NO in step 1406), the deployment control unit 1101 classifies the application to be deployed as a low-processing-rate application (step 1409). The low-processing-rate application is an application in which the transfer data is transferred as a still image.

Next, the deployment control unit 1101 searches the candidate processing servers in which the same video low-processing-rate application is deployed for a candidate processing server that satisfies the constraint conditions of the request processing rate and the request time of the application to be deployed (step 1410). Then, the deployment control unit 1101 performs the process of step 1411 and subsequent steps.

The same video low-processing-rate application is a low-processing-rate application that processes the same video as the application to be deployed. In step 1410, the transfer delay is calculated in a similar manner to step 1408, and it is determined that the constraint condition of the request time is satisfied if the transfer delay is equal to or less than the request time. Furthermore, it is determined that the constraint condition of the request processing rate is satisfied if the image rate of the transfer data transferred to the processing server 1002-$i$ is equal to or higher than the request processing rate.

With the candidate processing server in which the same video low-processing-rate application is deployed selected as a deployment destination processing server, it becomes possible to utilize the transfer data of the still image that has already been transferred, thereby suppressing an increase in the degree of parallelism of the still image transfer. As a result, the increase in traffic of the communication network 1004 is suppressed.

With the candidate processing server that satisfies the constraint condition of the request processing rate selected as a deployment destination processing server, it becomes possible to satisfy the constraint condition of the request processing rate of the application to be deployed.

With the candidate processing server that satisfies the constraint condition of the request time selected as a deployment destination processing server, it becomes possible to satisfy the constraint condition of the request time of the application to be deployed.

According to the process of steps 1406 to 1410, the application to be deployed is classified as a high-processing-rate application or a low-processing-rate application depending on the request processing rate. This makes it possible to determine the optimum deployment destination processing server using the difference in transfer data volume between the case of transferring the video as a moving image and the case of transferring the video as a still image.

If there is no low-load processing server (NO in step 1412), the deployment control unit 1101 divides the request processing rate and the request processing resources of the application to be deployed into smaller values (step 1414). Then, the deployment control unit 1101 performs the process of step 1405 and subsequent steps using the request processing rate and the request processing resources after the division.

With the process of step 1405 and subsequent steps performed again after dividing the request processing rate and the request processing resources, it becomes possible to select a plurality of candidate processing servers that does not satisfy the constraint condition of the request processing resources as deployment destination processing servers.

If one or a plurality of deployment destination processing servers that satisfies the constraint condition 1111 is determined (YES in step 1405), the communication unit 1103 transmits the application to be deployed to the deployment destination processing server (step 1416). Then, the deployment destination processing server installs the received application.

If there is no same video processing server (NO in step 1402), the deployment control unit 1101 performs the processing of step 1415. In step 1415, the deployment control unit 1101 determines the processing server 1002-$i$ with the lowest transfer delay among the processing servers 1002-$i$ with free resources as a deployment destination processing server. Then, the deployment control unit 1101 performs the processing of step 1416.

The deployment control unit 1101 also performs the processing of step 1415 and step 1416 if there is no free resource in any of the same video processing servers (NO in step 1403) and if there is no candidate processing server to be searched (NO in step 1411).

Next, the deployment control unit 1101 checks the classification of the application to be deployed (step 1417). If the application to be deployed is a high-processing-rate application (YES in step 1417), the deployment control unit 1101 performs the processing of step 1418.

In step 1418, the deployment control unit 1101 calculates the maximum video data volume that satisfies the constraint condition of the request time for each high-processing-rate application deployed in the deployment destination processing server. The high-processing-rate application to be subject to the maximum data volume calculation is the same video high-processing-rate application and the deployment target application deployed in the deployment destination processing server. In step 1418, it is determined that the constraint condition of the request time is satisfied if the sum of the processing time and the data transfer time of the transfer data is equal to or less than the request time.

Next, the deployment control unit 1101 selects the smallest maximum data amount among the maximum data amounts of the high-processing-rate applications to be calculated as a data amount of the transfer data to the deployment destination processing server (step 1419).

Next, the distribution control unit 1102 generates extraction control information indicating the data volume of the transfer data and that the transfer data type is a moving image, and the communication unit 1103 transmits the generated extraction control information to the processing server 1002-1 (step 1420).

Next, the distribution control unit 1102 generates transfer control information indicating the transfer destination and the image rate of the transfer data, and the communication unit 1103 transmits the generated transfer control information to the processing server 1002-1 (step 1423). Information indicating the deployment destination processing server is used as the transfer destination of the transfer data.

If the application to be deployed is a low-processing-rate application (NO in step 1417), the control server 1001 performs the processing of step 1421. In step 1421, the distribution control unit 1102 generates extraction control information indicating that the transfer data type is a still image and the processing rate of the extraction process for extracting the still image, and the communication unit 1103 transmits the generated extraction control information to the processing server 1002-1.

If the request processing rate of the application to be deployed is higher than the request processing rate of the same video low-processing-rate application deployed in the deployment destination processing server, the deployment control unit 1101 updates the image rate of the transfer data (step 1422). In this case, the deployment control unit 1101 selects the request processing rate of the application to be deployed as the image rate of the transfer data. Then, the control server 1001 performs the processing of step 1423.

In step 1422, if the request processing rate of the application to be deployed is equal to or lower than the request processing rate of the same video low-processing-rate application deployed in the deployment destination processing server, the deployment control unit 1101 does not update the image rate of the transfer data.

Figure 15:
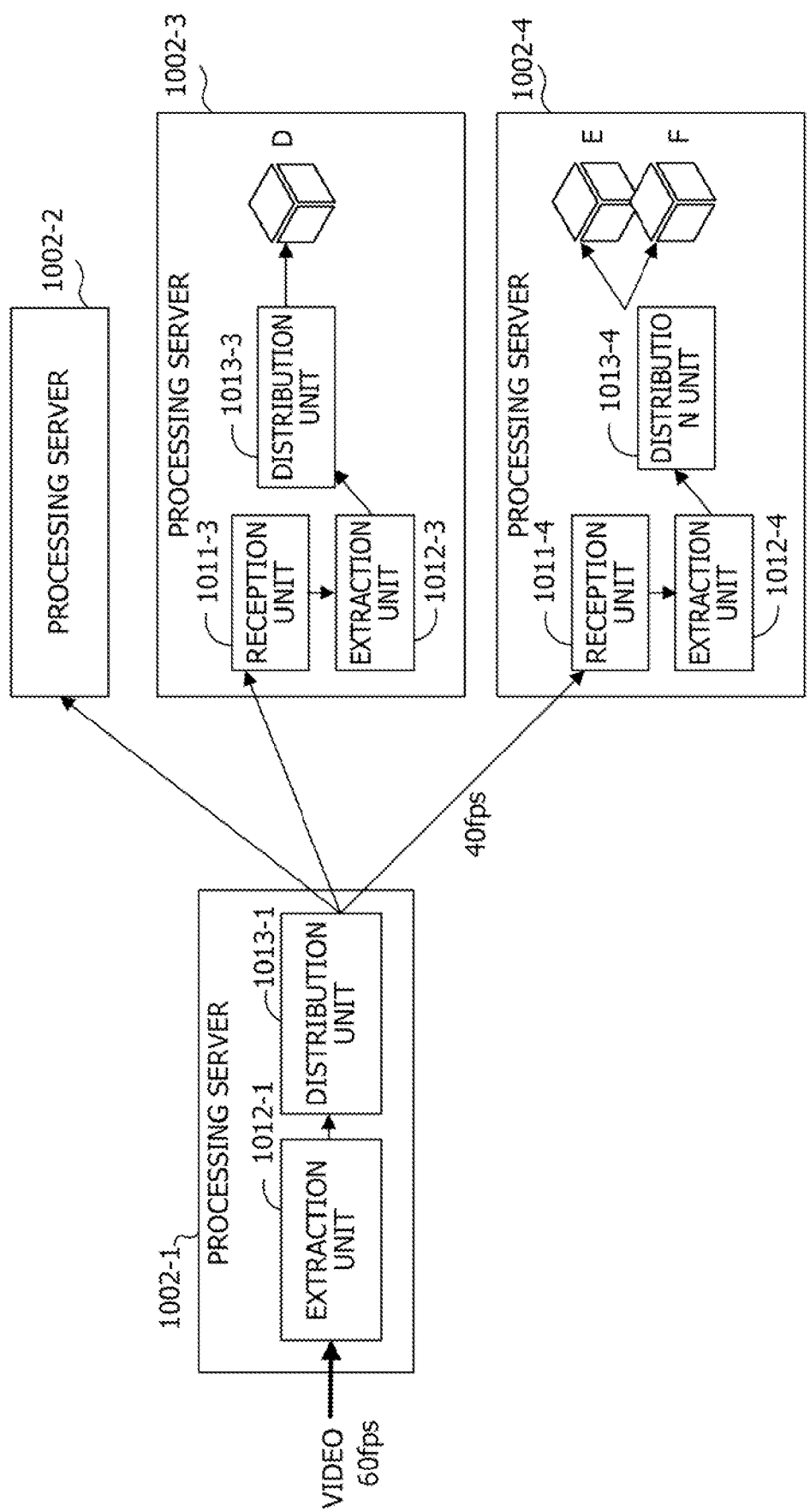
FIG. 15 is a diagram illustrating a deployment destination processing server of a high-processing-rate application.

FIG. 15 illustrates an exemplary deployment destination processing server of the high-processing-rate application. The image rate of the video to be input to the processing server 1002-1 is 60 fps. An application D is deployed in a processing server 1002-3, and an application E is deployed in a processing server 1002-4. An application F is a high-processing-rate application to be deployed. The application D and the application E are the same video high-processing-rate applications. Meanwhile, no same video high-processing-rate application is deployed in a processing server 1002-2.

In this case, the processing server 1002-3 and the processing server 1002-4 in which the same video high-processing-rate application is deployed are selected in step 1408, and the processing server 1002-4 that is a low-load processing server is selected in step 1412. Then, the processing server 1002-4 is determined to be the deployment destination processing server, and the application F is deployed to the processing server 1002-4.

The distribution unit 1013-1 of the processing server 1002-1 transfers the moving image transfer data to the processing servers 1002-3 and 1002-4 at the image rate of 40 fps. The reception unit 1011-3 of the processing server 1002-3 outputs the received transfer data to an extraction unit 1012-3, and the extraction unit 1012-3 extracts still images from the moving image to output them to a distribution unit 1013-3. The distribution unit 1013-3 outputs the still images output from the extraction unit 1012-3 to the application D.

A reception unit 1011-4 of the processing server 1002-4 outputs the received transfer data to the extraction unit 1012-4, and an extraction unit 1012-4 extracts still images from the moving image to output them to a distribution unit 1013-4. The distribution unit 1013-4 outputs the still images output from the extraction unit 1012-4 to the application E and the application F.

As described above, with the processing server in which the same video high-processing-rate application is deployed selected as a deployment destination processing server, it becomes possible to suppress the increase in the degree of parallelism of the moving image transfer, and to reduce the traffic of the communication network 1004.

Figure 16:
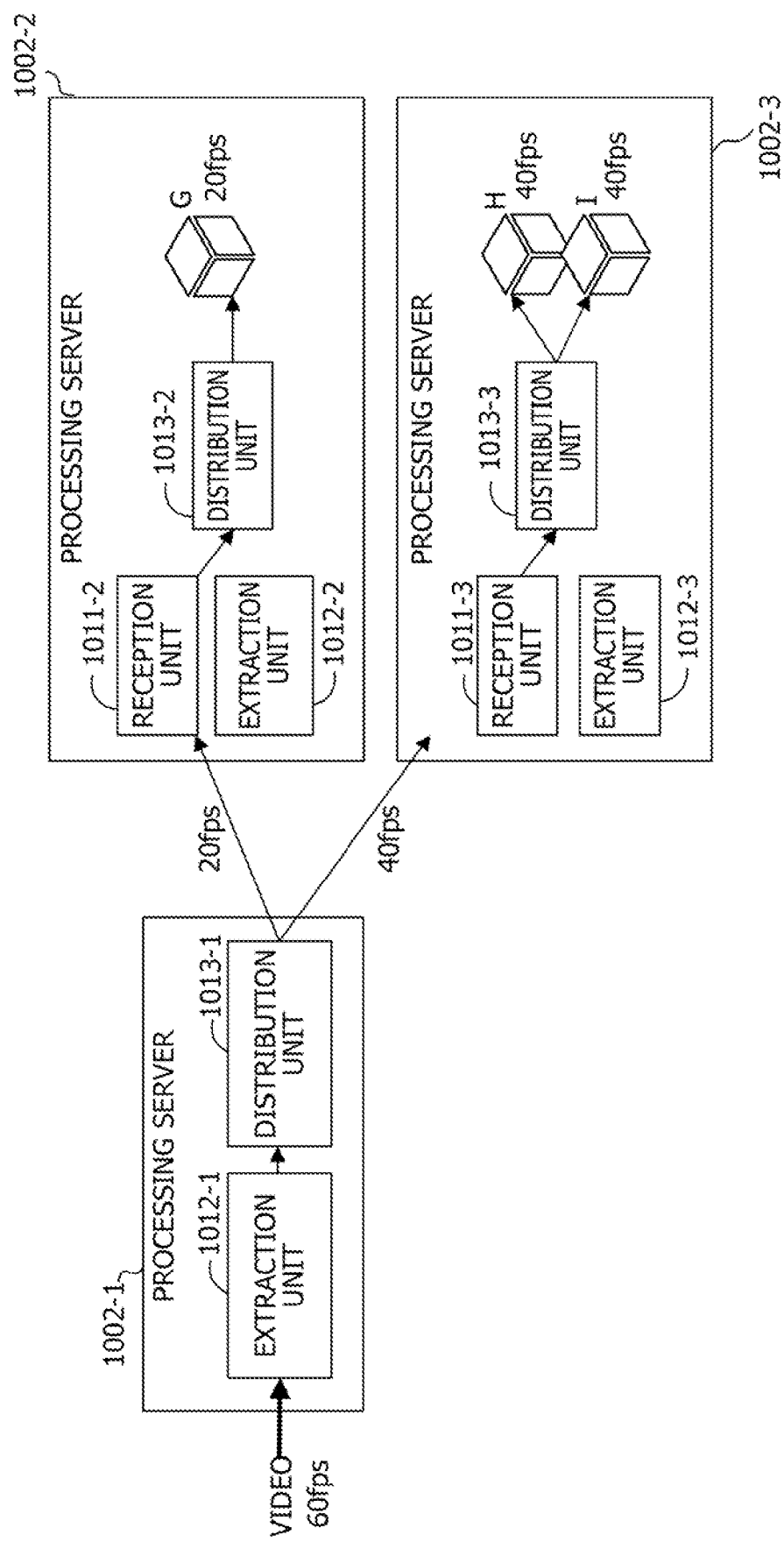
FIG. 16 is a diagram illustrating a deployment destination processing server of a low-processing-rate application.

FIG. 16 illustrates an exemplary deployment destination processing server of the low-processing-rate application. The image rate of the video to be input to the processing server 1002-1 is 60 fps. An application G is deployed in the processing server 1002-2, and an application H is deployed in the processing server 1002-3. An application I is a low-processing-rate application to be deployed. The application G and the application H are the same video low-processing-rate applications.

The request processing rate of the application G is 20 fps, and the request processing rate of the application H is 40 fps. In this case, the distribution unit 1013-1 of the processing server 1002-1 transfers the still image transfer data to the processing server 1002-2 at the image rate of 20 fps, and transfers the still image transfer data to the processing server 1002-3 at the image rate of 40 fps.

In a case where the request processing rate of the application I to be deployed is 40 fps, the image rate of the transfer data to the processing server 1002-2 is lower than the request processing rate of the application I. Therefore, the processing server 1002-2 does not satisfy the constraint condition of the request processing rate in step 1410. Meanwhile, since the image rate of the transfer data to the processing server 1002-3 is the same as the request processing rate of the application I, the processing server 1002-3 satisfies the constraint condition of the request processing rate in step 1410.

In this case, of the processing server 1002-2 and the processing server 1002-3 in which the same video low-processing-rate application is deployed, the processing server 1002-3 that satisfies the constraint condition of the request processing rate is selected in step 1410. Then, the processing server 1002-3 is determined to be the deployment destination processing server, and the application I is deployed to the processing server 1002-3.

A reception unit 1011-2 of the processing server 1002-2 outputs the received still image transfer data to a distribution unit 1013-2, and the distribution unit 1013-2 outputs the still image transfer data to the application G. The reception unit 1011-3 of the processing server 1002-3 outputs the received still image transfer data to the distribution unit 1013-3, and the distribution unit 1013-3 outputs the still image transfer data to the application H and the application I.

As described above, with the processing server in which the same video low-processing-rate application is deployed and satisfying the constraint condition of the request processing rate selected as a deployment destination processing server, it becomes possible to suppress the increase in traffic of the communication network 1004.

Figure 17:
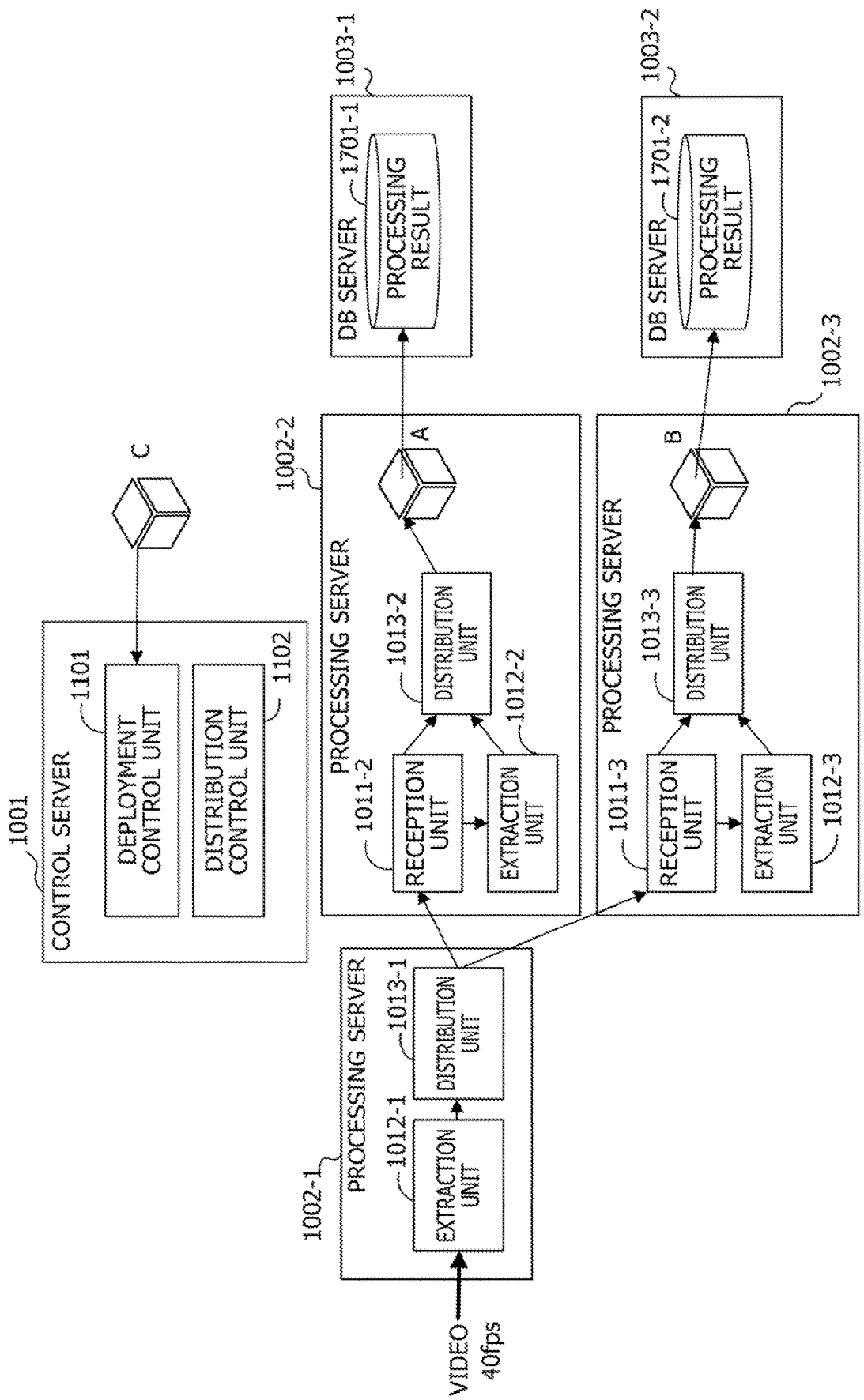
FIG. 17 is a diagram illustrating a deployment method for deploying the low-processing-rate application to the plurality of processing servers.

FIG. 17 illustrates an exemplary deployment method for deploying the low-processing-rate application to a plurality of processing servers. The image rate of the video input to the processing server 1002-1 is 40 fps, and the bit rate is 100 Mbps. A unit that expresses the number of bits per second is represented by bps.

The application A is deployed in the processing server 1002-2, and the application B is deployed in the processing server 1002-3. The application C is an application to be deployed.

FIGS. 18A and 18B illustrate examples of the constraint condition 1111 of the applications A to C. The constraint condition 1111 in FIGS. 18A and 18B includes request processing resources, a request time, a request processing rate, and a processing time for one image of each application. In this example, the processing resources indicate cores included in the CPU of the processing server.

FIG. 18A illustrates an example of the constraint condition 1111 of the deployed application A and application B. The request processing resources of the application A are six cores, the request time is 8 seconds, the request processing rate is 40 fps, and the processing time of one image is 0.025 seconds. The request processing resources of the application B are six cores, the request time is 10 seconds, the request processing rate is 20 fps, and the processing time of one image is 0.05 seconds.

FIG. 18B illustrates an example of the constraint condition 1111 of the application C to be deployed. The request processing resources of the application C are four cores, the request time is 15 seconds, the request processing rate is 40 fps, and the processing time of one image is 0.025 seconds.

In a case where the threshold value in step 1406 is 45 fps, the request processing rates of the applications A to C are lower than the threshold value, and thus the applications A to C are classified as low-processing-rate applications. Therefore, the application A and the application B are the same video low-processing-rate applications.

FIG. 19 illustrates exemplary processing resources of the processing server 1002-2 and the processing server 1002-3 in the state of FIG. 17. The total resource amount represents the number of cores included in each processing server, and the free resource represents the number of unused cores.

Since the request processing resources of the application A deployed in the processing server 1002-2 are 6 cores, six cores out of the eight cores of the total resource amount are used by the application A. Therefore, the free resources of the processing server 1002-2 are the remaining two cores.

Since the request processing resources of the application B deployed in the processing server 1002-3 are also six cores, six cores out of the eight cores of the total resource amount are used by the application B. Therefore, the free resources of the processing server 1002-3 are also two cores.

FIG. 20 illustrates exemplary image rates of the transfer data transferred to the processing server 1002-2 and the processing server 1002-3 in the state of FIG. 17. The transfer destination represents a transfer destination of the transfer data, and the maximum image rate represents the maximum value of the image rate of the transfer data transferred to the processing server of the transfer destination.

Since the request processing rate of the application A deployed in the processing server 1002-2 is 40 fps, the maximum image rate of the processing server 1002-2 is 40 fps. Meanwhile, since the request processing rate of the application B deployed in the processing server 1002-3 is 20 fps, the maximum image rate of the processing server 1002-3 is 20 fps.

FIG. 21 illustrates exemplary bandwidth between servers. The transmission source represents the processing server 1002-$i$ of the data transmission source, and the transmission destination represents the processing server 1002-$i$ or the DB server 1003-$j$ of the data transmission destination. In this example, the bandwidth between any of the servers is 1,000 Mbps.

The distribution unit 1013-1 of the processing server 1002-1 transfers the still image transfer data to the processing server 1002-2 at the image rate of 40 fps, and transfers the still image transfer data to the processing server 1002-3 at the image rate of 20 fps.

The reception unit 1011-2 of the processing server 1002-2 outputs the received still image transfer data to the distribution unit 1013-2, and the distribution unit 1013-2 outputs the still image transfer data to the application A.

The application A sequentially processes the transfer data received from the distribution unit 1013-2, and transmits a processing result 1701-1 to the DB server 1003-1. The DB server 1003-1 stores the processing result 1701-1 received from the processing server 1002-2.

The reception unit 1011-3 of the processing server 1002-3 outputs the received still image transfer data to the distribution unit 1013-3, and the distribution unit 1013-3 outputs the still image transfer data to the application B. The application B sequentially processes the transfer data received from the distribution unit 1013-3, and transmits a processing result 1701-2 to the DB server 1003-2. The DB server 1003-2 stores the processing result 1701-2 received from the processing server 1002-3.

Since the maximum image rate of the processing server 1002-2 is the same as the request processing rate of the application C to be deployed, the processing server 1002-2 satisfies the constraint condition of the request processing rate in step 1410. Meanwhile, since the maximum image rate of the processing server 1002-3 is lower than the request processing rate of the application C, the processing server 1002-3 does not satisfy the constraint condition of the request processing rate in step 1410.

Next, since the bit rate of the video input to the processing server 1002-1 is 100 Mbps, the data volume corresponding the video per unit time is 100 Mb. Since the bandwidth between the processing server 1002-1 and the processing server 1002-2 is 1,000 Mbps, a data transfer time T31 for the processing server 1002-1 to transfer the transfer data of 100 Mb to the processing server 1002-2 is 0.1 seconds.

Since the bandwidth between the processing server 1002-2 and the DB server 1003-1 is 1,000 Mbps, a data transfer time T32 for the processing server 1002-2 to transfer the processing result of 100 Mb to the DB server 1003-1 is 0.1 seconds.

Therefore, the transfer delay, which is the sum of the data transfer time T31 and the data transfer time T32, is 0.2 seconds, which is shorter than the request time of the application C, and thus the processing server 1002-2 satisfies the constraint condition of the request time in step 1410.

Next, since the bandwidth between the processing server 1002-1 and the processing server 1002-3 is 1,000 Mbps, a data transfer time T41 for the processing server 1002-1 to transfer the transfer data of 100 Mb to the processing server 1002-3 is 0.1 seconds.

Since the bandwidth between the processing server 1002-3 and the DB server 1003-2 is 1,000 Mbps, a data transfer time T42 for the processing server 1002-3 to transfer the processing result of 100 Mb to the DB server 1003-2 is 0.1 seconds.

Therefore, the transfer delay, which is the sum of the data transfer time T41 and the data transfer time T42, is 0.2 seconds, which is shorter than the request time of the application C, and thus the processing server 1002-3 satisfies the constraint condition of the request time in step 1410.

In this case, of the processing server 1002-2 and the processing server 1002-3 in which the same video low-processing-rate application is deployed, the processing server 1002-2 that satisfies the constraint conditions of the request processing rate and the request time is selected in step 1410. However, since the free resources of the processing server 1002-2 are less than the request processing resources of the application C, the processing server 1002-2 does not correspond to the low-load processing server in step 1412.

In view of the above, in step 1414, the request processing rate and the request processing resources of the application C are divided according to the free resources of the processing server 1002-2. The free resources of the processing server 1002-2 are two cores, which corresponds to ½ of the request processing resources of the application C. Accordingly, the request processing rate and the request processing resources of the application C are each divided into two, the request processing rate after the division is 20 fps, and the request processing resources after the division are two cores.

With the process of step 1405 and subsequent steps performed using the request processing rate and the request processing resources after the division, the processing server 1002-2 is selected again in step 1410. Since the free resources of the processing server 1002-2 are the same as the divided request processing resources of the application C, the processing server 1002-2 corresponds to the low-load processing server. Accordingly, the processing server 1002-2 is determined to be the deployment destination processing server in step 1413.

However, since only ½ of the request processing resources before the division is secured only by the processing server 1002-2, it is determined in step 1405 that the deployment destination processing server that satisfies the constraint condition 1111 has not been determined. Then, in step 1410, it is checked whether or not the processing server 1002-3 in which the same video low-processing-rate application is deployed satisfies the constraint condition of the request processing rate.

In this case, since the request processing rate after the division is 20 fps, which is the same as the maximum image rate of the processing server 1002-3, the processing server 1002-3 satisfies the constraint condition of the request processing rate. Moreover, since the free resources of the processing server 1002-3 are the same as the request processing resources after the division, the processing server 1002-3 corresponds to the low-load processing server. Accordingly, the processing server 1002-3 is determined to be the deployment destination processing server in step 1413.

As a result, the request processing resources before the division are secured, and thus it is determined in step 1405 that the deployment destination processing server that satisfies the constraint condition 1111 is determined. Accordingly, in step 1416, the deployment control unit 1101 deploys the application C to the processing server 1002-2 and the processing server 1002-3, which are the deployment destination processing servers.

Figure 22:
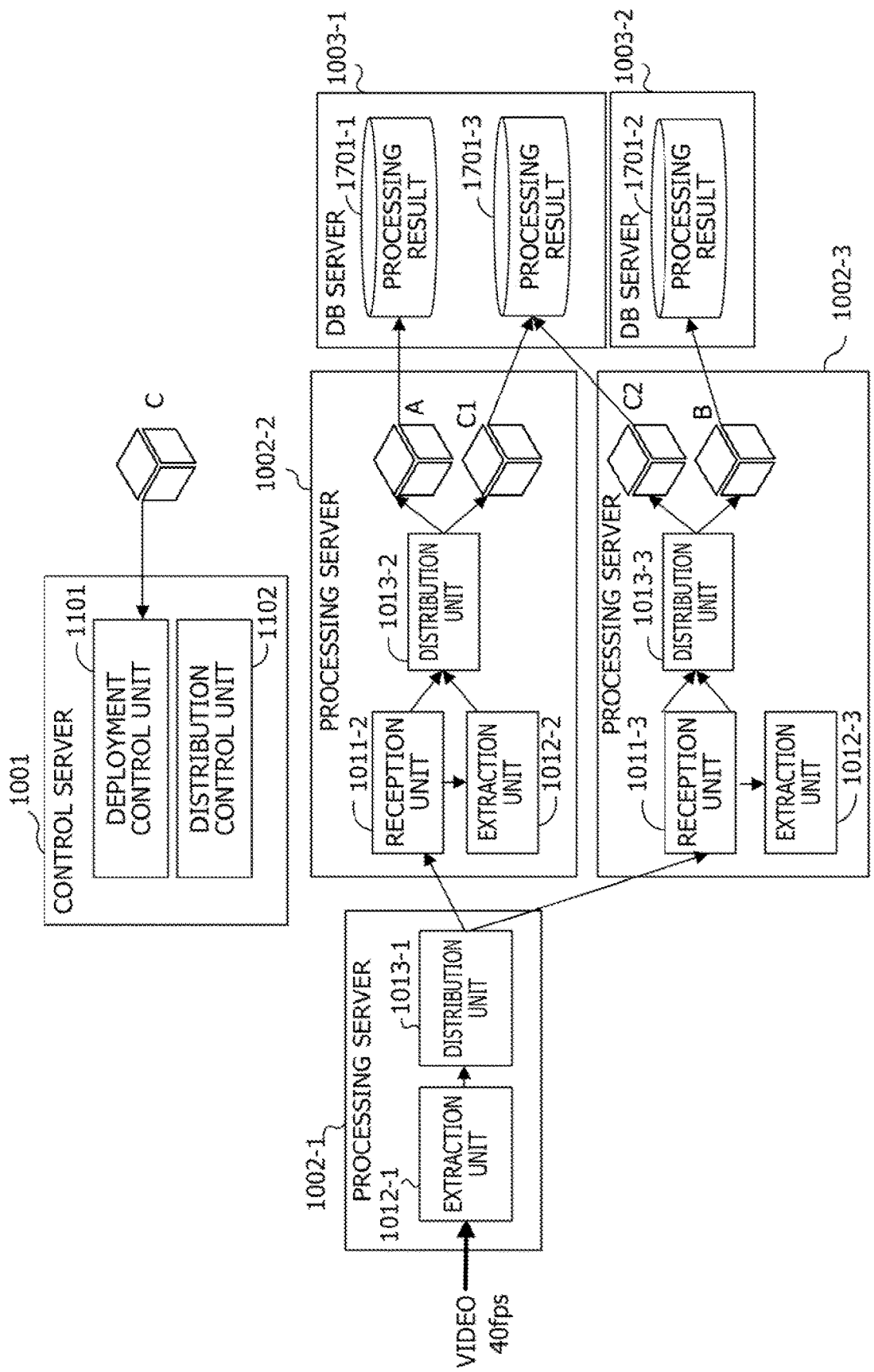
FIG. 22 is a diagram illustrating a result of application deployment.

FIG. 22 illustrates an exemplary deployment result of the application C. The deployment control unit 1101 copies the application C to generate an application C1 and an application C2. Then, the communication unit 1103 transmits the application C1 to the processing server 1002-2, and transmits the application C2 to the processing server 1002-3. As a result, the application C1 and the application C2 are deployed to the processing server 1002-2 and the processing server 1002-3, respectively.

Next, in step 1421, the processing rate of the extraction process is set to 20 fps, which is the request processing rate after the division, and the extraction control information indicating the set processing rate of the extraction process is transmitted to the processing server 1002-1. Note that the image rate of the transfer data is not updated in step 1422 as the request processing rate after the division is equal to or lower than the request processing rates of the application A and the application B.

The extraction unit 1012-1 of the processing server 1002-1 extracts the still image transfer data from the video at the processing rate of 40 fps. The distribution unit 1013-1 transfers the still image to the processing server 1002-2 at the image rate of 40 fps, and transfers the still image to the processing server 1002-3 at the image rate of 20 fps.

The reception unit 1011-2 of the processing server 1002-2 receives the still image from the processing server 1002-1, and outputs it to the distribution unit 1013-2. The distribution unit 1013-2 transfers the still image to the application A at the image rate of 40 fps, and transfers the still image to the application C1 at the image rate of 20 fps.

The reception unit 1011-3 of the processing server 1002-3 receives the still image from the processing server 1002-1, and outputs it to the distribution unit 1013-3. The distribution unit 1013-3 transfers the still image to the application B at the image rate of 20 fps, and transfers the still image to the application C2 at the image rate of 20 fps.

The application C1 sequentially processes the still image received from the distribution unit 1013-2, and transmits a processing result to the DB server 1003-1. The application C2 sequentially processes the still image received from the distribution unit 1013-3, and transmits a processing result to the DB server 1003-1. The DB server 1003-1 stores the processing results of the application C1 and application C2 as a processing result 1701-3.

According to the deployment result of FIG. 22, the video is divided into image units, and processed by the application C1 and the application C2 in parallel. As a result, the free resources of each processing server are effectively utilized, and the application capacity in the image processing system improves.

Next, a specific example of calculating the maximum video data volume that satisfies the constraint condition of the request time in step 1418 will be described. It is assumed that the deployment destination processing server is the processing server 1002-2 and the high-processing-rate application to be subject to the maximum data volume calculation is an application J. The image rate of the video input to the processing server 1002-1 is 40 fps, and the bit rate is 100 Mbps.

Since the bit rate of the video is 100 Mbps, the data volume corresponding to the video for x seconds is 100x Mb. Since the bandwidth between the processing server 1002-1 and the processing server 1002-2 is 1,000 Mbps, a data transfer time T51 for the processing server 1002-1 to transfer the transfer data of 100x Mb to the processing server 1002-2 is 0.1x seconds.

In a case where the request processing rate of the application J is 20 fps, the number of images processed by the application J in x seconds is 20x. In a case where the processing time of one image of the application J is 0.025 seconds, a processing time T52 for the application J deployed to the processing server 1002-2 to process 20x images is 0.5x seconds.

Since the bandwidth between the processing server 1002-2 and the DB server 1003-1 is 1,000 Mbps, a data transfer time T53 for the processing server 1002-2 to transfer the processing result of 100x Mb to the DB server 1003-1 is 0.1x seconds.

In this case, the sum of the data transfer time T51, the processing time T52, and the data transfer time T53 is 0.7x seconds. In a case where the request time of the application J is 15 seconds, the constraint condition of the request time is expressed by the following inequality.

$$0.7x \le 15 \quad (1)$$

The maximum value of x that satisfies the inequality (1) is 15/0.7=21.43. Since the bit rate of the video is 100 Mbps, the maximum video data volume that satisfies the constraint condition of the request time is 2,143 Mb.

According to the application deployment process of FIGS. 14A and 14B, it becomes possible to determine the deployment destination processing server that satisfies the constraint condition 1111 and suppresses the increase in traffic in a case of deploying applications with various kinds of performance at any timing.

Figure 23:
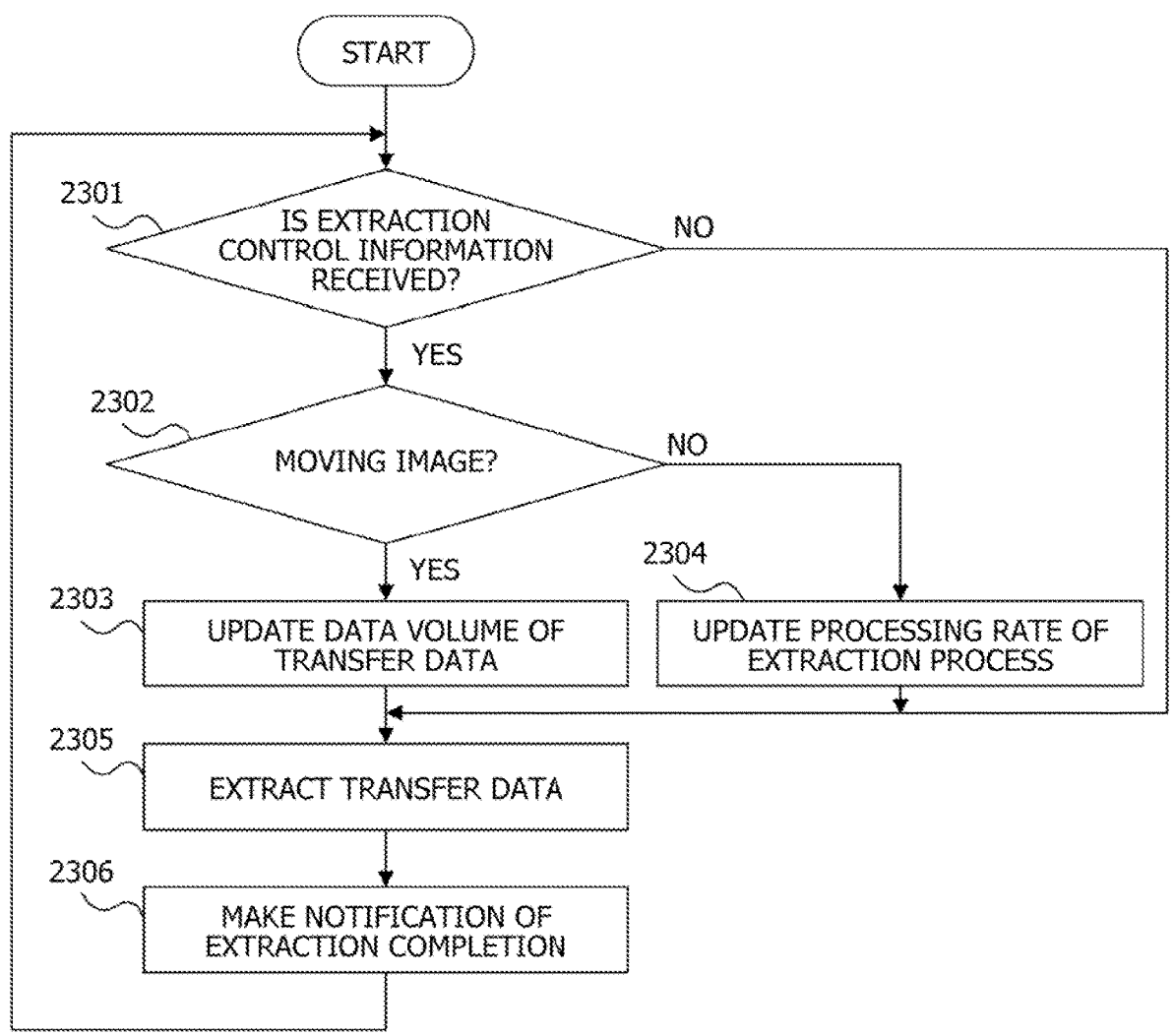
FIG. 23 is a flowchart of an extraction process.

FIG. 23 is a flowchart illustrating an exemplary extraction process performed by the extraction unit 1012-1 of the processing server 1002-1 in FIG. 10. First, the extraction unit 1012-1 checks whether or not the extraction control information is received from the control server 1001 (step 2301). If the extraction control information is received (YES in step 2301), the extraction unit 1012-1 checks the type of the transfer data indicated by the extraction control information (step 2302).

If the type of the transfer data is a moving image (YES in step 2302), the extraction unit 1012-1 updates the data volume of the transfer data of the moving image to the data volume indicated by the extraction control information (step 2303), and extracts the moving image of the data volume of the transfer data from the video (step 2305).

If the type of the transfer data is a still image (NO in step 2302), the extraction unit 1012-1 obtains the maximum processing rate of the request processing rate of the same video low-processing-rate application being executed and the processing rate of the extraction process indicated by the extraction control information. Then, the extraction unit 1012-1 updates the processing rate of the extraction process of the still image to the maximum processing rate (step 2304), and extracts the still image from the video at the processing rate of the extraction process (step 2305).

Next, the extraction unit 1012-1 notifies the distribution unit 1013-1 of the extraction completion, (step 2306), and repeats the process of step 2301 and subsequent steps.

If no extraction control information is received (NO in step 2301), the extraction unit 1012-1 performs the process of step 2305 and subsequent steps without updating the data volume of the transfer data or the processing rate of the extraction process.

In the deployment result illustrated in FIG. 22, the request processing rate of the application A, which is the same video low-processing-rate application being executed, is 40 fps, and the request processing rate of the application B is 20 fps. Furthermore, since the divided request processing rate of the application C is 20 fps, the processing rate of the extraction process indicated by the extraction control information is 20 fps. In this case, the maximum processing rate 40 fps is set as the updated processing rate of the extraction process in step 2304.

Figure 24:
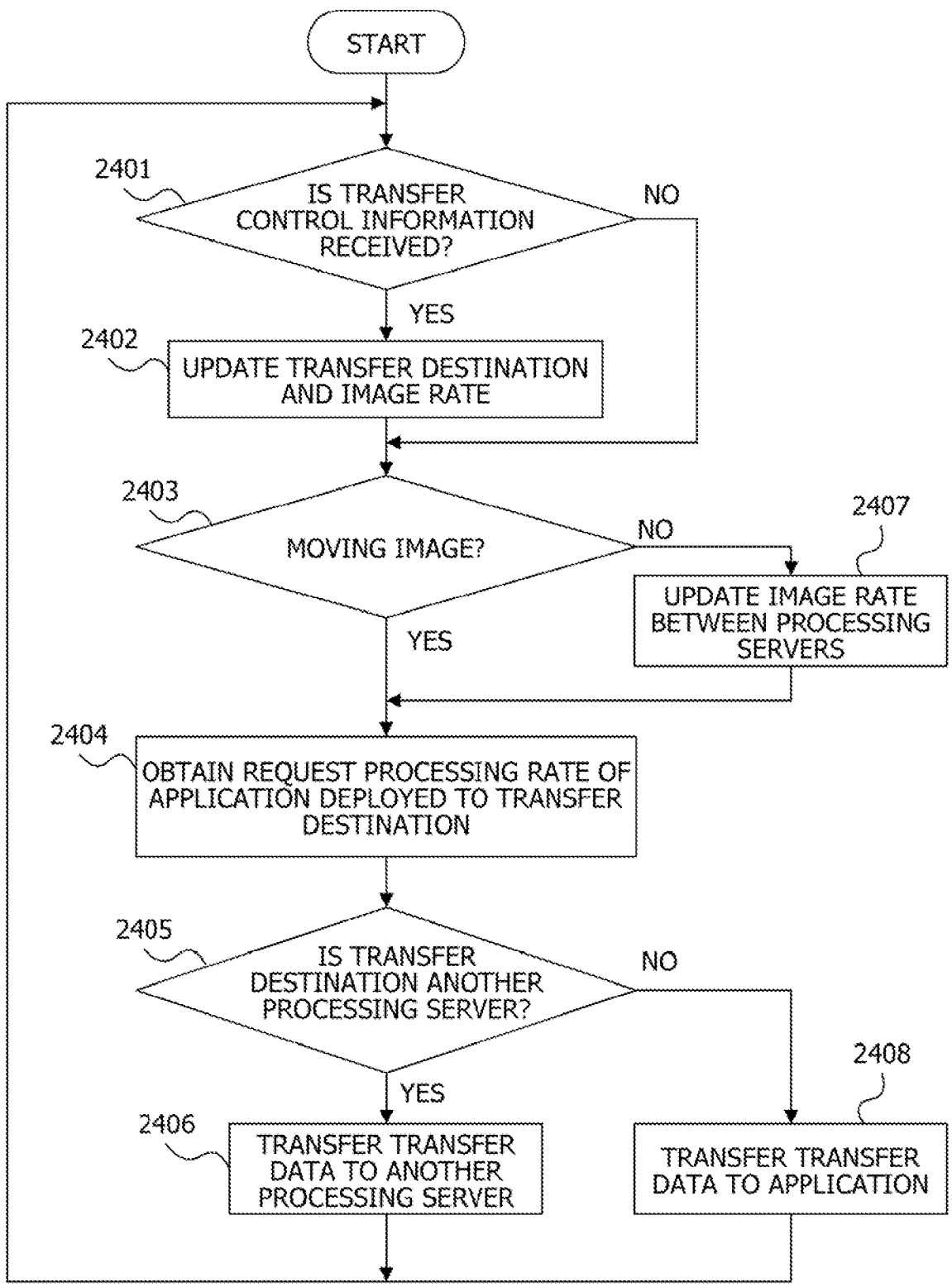
FIG. 24 is a flowchart of a distribution process.

FIG. 24 is a flowchart illustrating an exemplary distribution process performed by the distribution unit 1013-1 of the processing server 1002-1 in FIG. 10. First, the distribution unit 1013-1 checks whether or not the transfer control information is received from the control server 1001 (step 2401). If the transfer control information is received (YES in step 2401), the distribution unit 1013-1 updates the transfer destination and the image rate of the transfer data according to the transfer destination and the image rate indicated by the transfer control information (step 2402).

Next, the distribution unit 1013-1 checks the type of the transfer data output from the extraction unit 1012-1 (step 2403). If the type of the transfer data is a moving image (YES in step 2403), the distribution unit 1013-1 obtains the request processing rate of the application that processes the transfer data for each processing server of the transfer destination (step 2404).

Next, the distribution unit 1013-1 checks whether or not the transfer destination is another processing server 1002-$i$ (step 2405). If the transfer destination is the another processing server 1002-$i$ (YES in step 2405), the distribution unit 1013-1 transfers the transfer data of the moving image or the still image to the processing server 1002-$i$ of the transfer destination (step 2406). At this time, the distribution unit 1013-1 also transfers the request processing rate of the application that processes the transfer data together with the transfer data. Then, the distribution unit 1013-1 repeats the process of step 2401 and subsequent steps.

If the transfer destination is the processing server 1002-1 (NO in step 2405), the distribution unit 1013-1 transfers the transfer data of the still image to the application in the processing server 1002-1 at the image rate of the transfer data (step 2408). Then, the distribution unit 1013-1 repeats the process of step 2401 and subsequent steps.

If the transfer control information is not received (NO in step 2401), the distribution unit 1013-1 performs the process of step 2403 and subsequent steps. If the type of the transfer data is a still image (NO in step 2403), the distribution unit 1013-1 updates the image rate of the transfer data between the processing servers on the basis of the image rate updated in step 2402 (step 2407), and performs the process of step 2404 and subsequent steps.

FIGS. 25A to 25D illustrate exemplary update processing in step 2402. A processing server represents a processing server 1002-$i$ of the transfer destination, an address represents an address of the processing server 1002-$i$ of the transfer destination, and an image rate represents an image rate of the transfer data transferred to the processing server 1002-$i$ of the transfer destination.

FIG. 25A illustrates an exemplary transfer destination and image rate of the transfer data for the same video low-processing-rate application deployed in the processing server 1002-4. The address of the processing server 1002-4 of the transfer destination is "192.168.0.40", and the image rate is 20 fps.

FIG. 25B illustrates an exemplary transfer destination and image rate indicated by the transfer control information. The processing server of the transfer destination is the processing server 1002-4, and the image rate is 40 fps. FIG. 25C illustrates an exemplary update result based on the transfer control information of FIG. 25B. The image rate of the processing server 1002-4 of the transfer destination is updated from 20 fps to 40 fps according to the transfer control information of FIG. 25B.

FIG. 25D illustrates an exemplary update result when the transfer destination indicated by the transfer control information is a processing server 1002-5. In this case, an entry with the processing server 1002-5 as the transfer destination is added according to the transfer control information. The address of the added entry is "192.168.0.50", and the image rate is 40 fps.

Meanwhile, the compression rate of the video in which a change in a position of an object in an image is small becomes higher while the compression rate of the video in which a change in a position of an object is large becomes lower. Accordingly, the data volume of the video input to the processing server 1002-1 fluctuates according to the movement of the object in the image.

Figure 26:
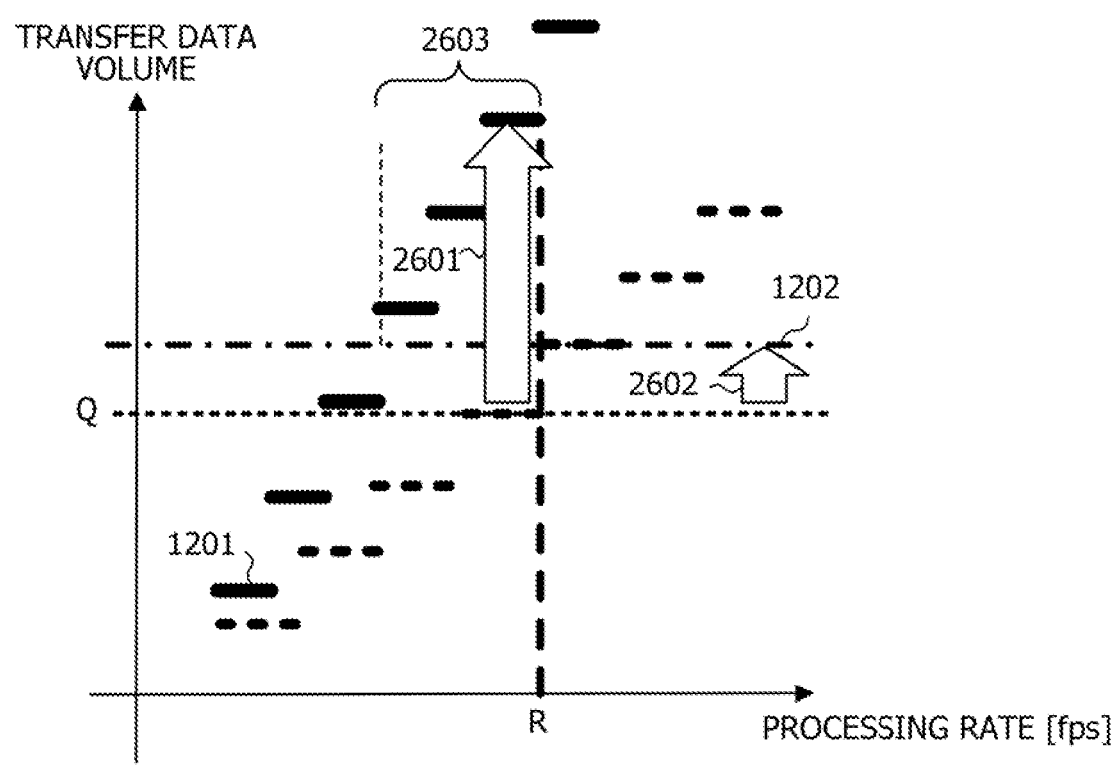
FIG. 26 is a diagram illustrating the relationship between the application processing rate and transfer data volume in a case where video data volume fluctuates.

FIG. 26 illustrates an exemplary relationship between the transfer data volume and the processing rate of the application in a case where the video data volume fluctuates. In this example, the plurality of segments 1201 illustrated in FIG. 12 moves upward as indicated by an arrow 2601, and the dash-dotted line 1202 moves upward as indicated by an arrow 2602. In this case, in a range 1603 of the processing rate equal to or lower than the predetermined value R, the transfer data volume indicated by the segment 1201 is larger than the transfer data volume indicated by the dash-dotted line 1202.

In this state, when the application is classified using the predetermined value R as a threshold value, the application with the request processing rate in the range 1603 is classified as the low-processing-rate application. Accordingly, the traffic of the still image transfer data in the communication network 1004 increases more than expected, and the bandwidth between the servers is compressed.

In view of the above, in a case where the bit rate of the transfer data input to each processing server 1002-$i$ approaches the upper limit of the bandwidth, it is preferable that the low-processing-rate application, which causes the increase in the bit rate, is redeployed to another processing server 1002-$i$.

Figure 27:
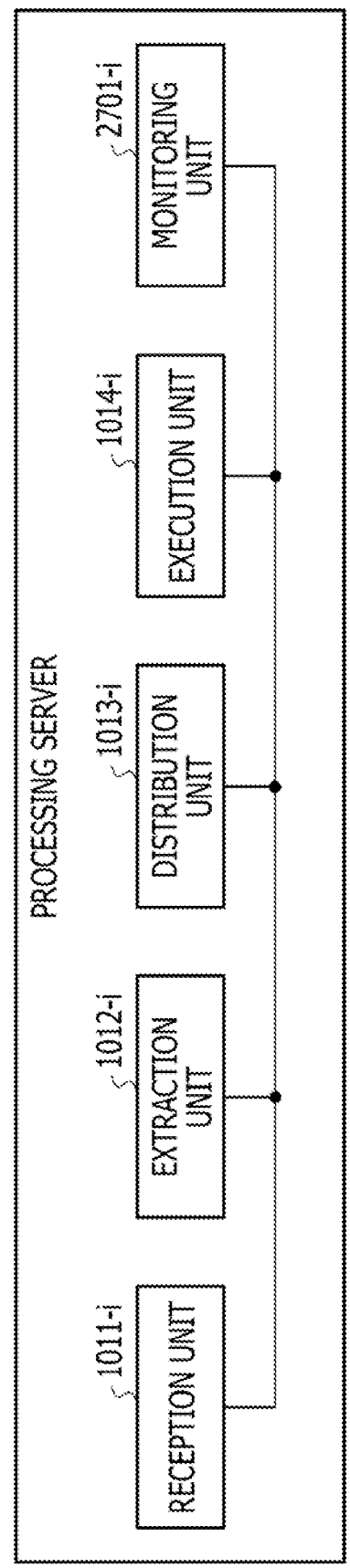
FIG. 27 is a functional configuration diagram of the processing server.

FIG. 27 illustrates an exemplary functional configuration of the processing server 1002-$i$ ($i=2$ to N) that monitors the bit rate of the input transfer data. The processing server 1002-$i$ of FIG. 27 has a configuration in which a monitoring unit 2701-$i$ is added to the processing server 1002-$i$ in FIG. 10. The monitoring unit 2701-$i$ monitors the bit rate of the transfer data input to the processing server 1002-$i$, and notifies the control server 1001 of the status of the processing server 1002-$i$ when the bit rate approaches the upper limit of the bandwidth.

Figure 28:
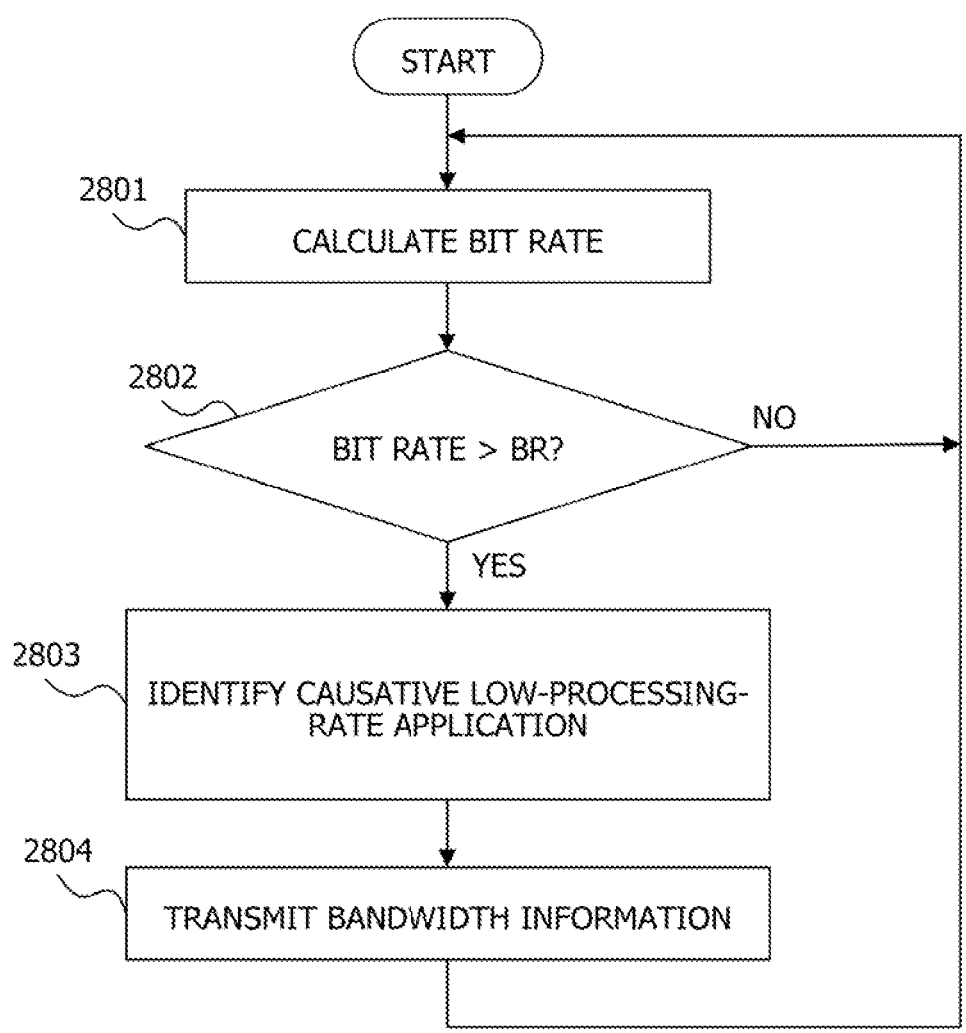
FIG. 28 is a flowchart of a monitoring process.

FIG. 28 is a flowchart illustrating an exemplary monitoring process performed by the monitoring unit 2701-$i$ in FIG. 27. First, the monitoring unit 2701-$i$ calculates the bit rate of the transfer data input to the processing server 1002-$i$ (step 2801), and compares the calculated bit rate with a predetermined value BR (step 2802). As the predetermined value BR, a value smaller than the upper limit of the bandwidth of the transfer data received by the processing server 1002-$i$ and close to the upper limit of the bandwidth is used.

If the bit rate is equal to or lower than the predetermined value BR (NO in step 2802), the monitoring unit 2701-$i$ repeats the process of step 2801 and subsequent steps.

If the bit rate is higher than the predetermined value BR (YES in step 2802), the monitoring unit 2701-$i$ identifies the low-processing-rate application that causes the increase in the bit rate (step 2803). For example, the low-processing-rate application with the highest request processing rate among the low-processing-rate applications deployed in the processing server 1002-$i$ is identified as the causative low-processing-rate application.

Next, the monitoring unit 2701-$i$ transmits bandwidth information indicating that the bit rate is approaching the upper limit of the bandwidth to the control server 1001 (step 2804). The bandwidth information includes identification information of the causative low-processing-rate application. Then, the monitoring unit 2701-$i$ repeats the process of step 2801 and subsequent steps.

Figure 29:
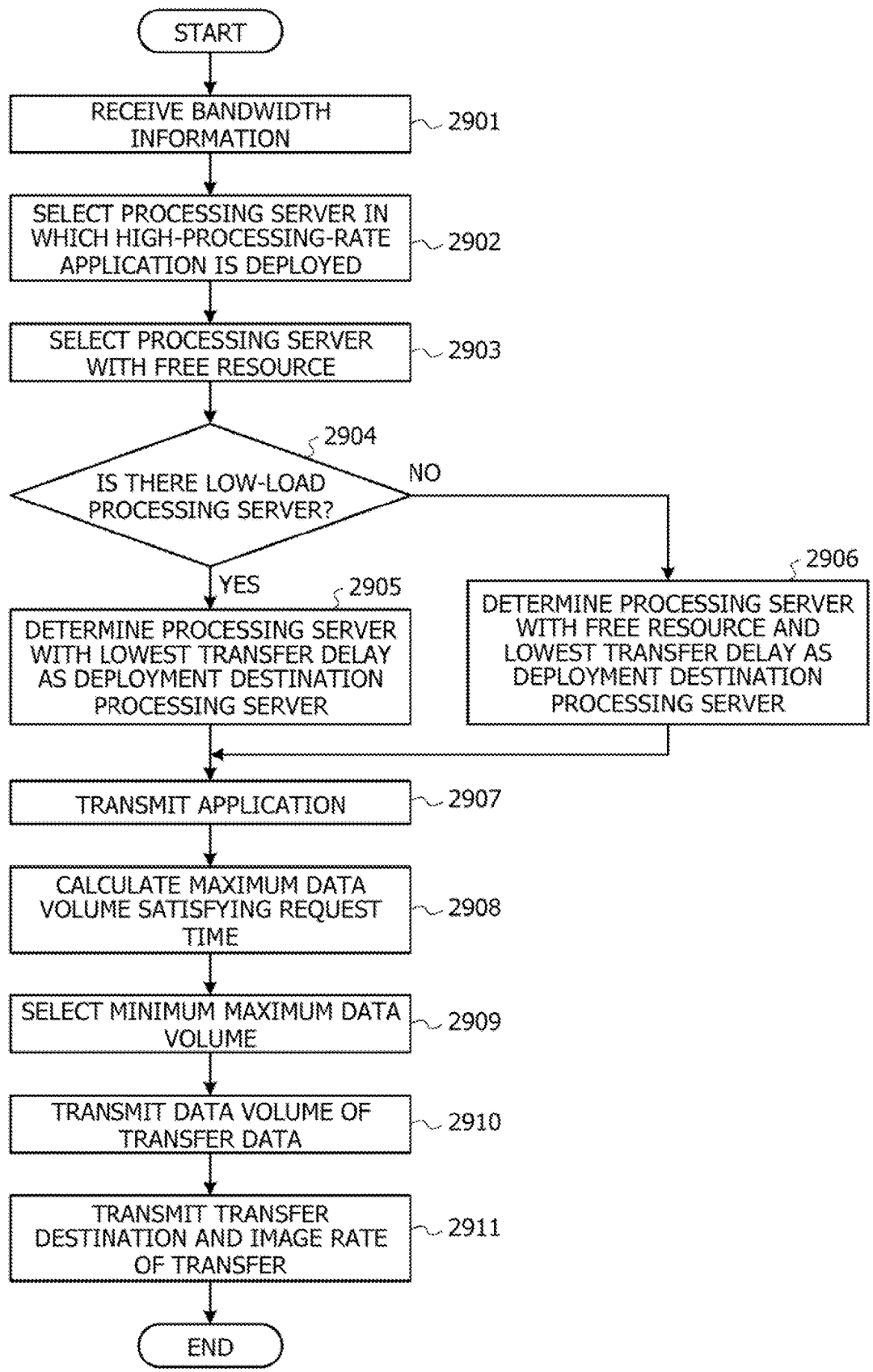
FIG. 29 is a flowchart of an application redeployment process.

FIG. 29 is a flowchart illustrating an exemplary application redeployment process performed by the control server 1001 in FIG. 10. First, the communication unit 1103 receives the bandwidth information from the processing server 1002-$i$ (step 2901).

Next, the deployment control unit 1101 selects another processing server 1002-$i$ in which the high-processing-rate application that processes the same video as the low-processing-rate application indicated by the bandwidth information is deployed (step 2902).

Next, the deployment control unit 1101 selects the processing server 1002-$i$ with free resources from among the selected processing servers 1002-$i$ (step 2903). Then, the deployment control unit 1101 checks whether or not there is a low-load processing server in the selected processing servers (step 2904). The low-load processing server is the processing server 1002-$i$ that satisfies the constraint condition of the request processing resources of the low-processing-rate application indicated by the bandwidth information.

If there is a low-load processing server (YES in step 2904), the deployment control unit 1101 determines the processing server 1002-$i$ with the lowest transfer delay among the low-load processing servers as a deployment destination processing server (step 2905).

If there is no low-load processing server (NO in step 2904), the deployment control unit 1101 performs the processing of step 2906. In step 2906, the deployment control unit 1101 determines the processing server 1002-$i$ with the lowest transfer delay among the processing servers 1002-$i$ with free resources as a deployment destination processing server.

Next, the communication unit 1103 transmits the low-processing-rate application indicated by the bandwidth information to the deployment destination processing server as a high-processing-rate application (step 2907). Then, the deployment destination processing server installs the received application.

Next, the control server 1001 performs the process of steps 2908 to 2911. The process of steps 2908 to 2911 is similar to the process of steps 1418 to 1420 and step 1423 in FIG. 14B.

According to the application redeployment process of FIG. 29, it becomes possible to redeploy the application to another processing server and to reduce the traffic of the still image transfer data when the bit rate of the transfer data input to any of the processing servers increases. At this time, the free resources of another processing server to which the moving image transfer data has already been input are utilized, whereby the execution of each application may be continued without affecting the data transfer and the processing of other applications.

The configuration of the image processing control device 801 of FIG. 8 is merely an example, and some constituent elements may be omitted or modified depending on the use or conditions of the image processing control device 801.

The configurations of the image processing system in FIGS. 1, 4, and 10 are merely examples, and some constituent elements may be omitted or modified depending on the use or conditions of the image processing system. The configuration of the control server 1001 of FIG. 11 is merely an example, and some constituent elements may be omitted or modified depending on the use or conditions of the image processing system. The configuration of the processing server 1002-$i$ of FIG. 27 is merely an example, and some constituent elements may be omitted or modified depending on the use or conditions of the image processing system.

The flowcharts of FIGS. 9, 13, 14A, 14B, 23, 24, 28, and 29 are merely examples, and some steps may be omitted or modified depending on the configuration or conditions of the image processing control device 801 or the image processing system.

The data transfer time T21, the processing time T22, and the data transfer time T23 illustrated in FIG. 2 are merely examples, and the data transfer time and the processing time vary depending on the input video and the application. The usage statuses of the processing resources illustrated in FIG. 3 are merely examples, and the usage status of the processing resources vary depending on the input video and the application.

The applications illustrated in FIGS. 5, 15 to 17, and 22 are merely examples, and the application to be deployed vary depending on the use or conditions of the image processing system. The moving image and the still images illustrated in FIG. 6 are merely examples, and the moving image and the still images vary depending on the input video. The start time of the image processing illustrated in FIG. 7 is merely an example, and the start time of the image processing varies depending on the input video.

The transfer data volume illustrated in FIGS. 12 and 26 is merely an example, and the transfer data volume varies depending on the input video. The constraint conditions illustrated in FIGS. 18A and 18B are merely examples, and the constraint conditions vary depending on the application.

The total resource amounts and the free resources illustrated in FIG. 19 are merely examples, and the total resource amount and the free resources vary depending on the processing server. The image rates illustrated in FIG. 20 and FIGS. 25A to 25D are merely examples, and the image rate of the transfer data varies depending on the deployed application. The bandwidth between the servers illustrated in FIG. 21 is merely an example, and the bandwidth between the servers varies depending on the communication network.

Figure 30:
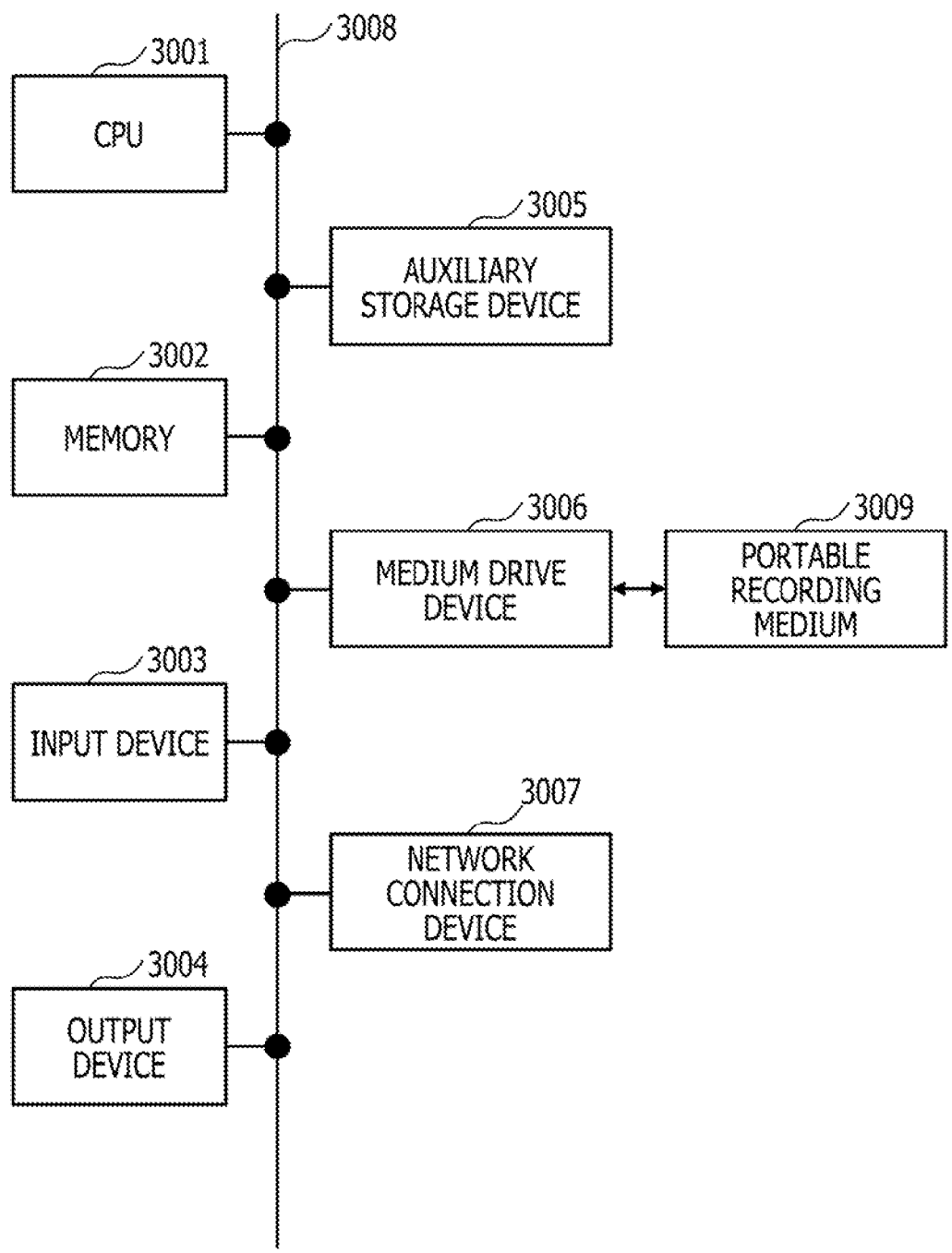
FIG. 30 is a hardware configuration diagram of an information processing device.

FIG. 30 illustrates an exemplary hardware configuration of the information processing device used as the image processing control device 801 in FIG. 8, the control server 1001 in FIG. 10, or the processing server 1002-$i$ in FIGS. 10 and 27. The information processing device of FIG. 30 includes a central processing unit (CPU) 3001, a memory 3002, an input device 3003, an output device 3004, an auxiliary storage device 3005, a medium drive device 3006, and a network connection device 3007. Those constituent elements are hardware, and are coupled to each other by a bus 3008.

The memory 3002 is, for example, a semiconductor memory such as a read only memory (ROM), a random access memory (RAM), a flash memory, or the like, and stores programs and data used for processing. The memory 3002 may be used as the storage unit 1104 in FIG. 11.

The CPU 3001 (processor) operates as the determination unit 811 and the selection unit 812 in FIG. 8 by, for example, executing a program using the memory 3002. The CPU 3001 also operates as the deployment control unit 1101 and the distribution control unit 1102 in FIG. 11 by executing a program.

The CPU 3001 also operates as the reception unit 1011-$i$, the extraction unit 1012-$i$, the distribution unit 1013-$i$, and the execution unit 1014-$i$ in FIG. 10 by executing a program. The CPU 3001 also operates as the monitoring unit 2701-$i$ in FIG. 27 by executing a program.

The input device 3003 is, for example, a keyboard, a pointing device, or the like, and is used for inputting information or instructions from an operator or a user. The output device 3004 is, for example, a display device, a printer, a speaker, or the like, and is used for inquiring of the operator or the user or outputting a processing result. The processing result may be an application processing result.

The auxiliary storage device 3005 is, for example, a magnetic disk device, an optical disk device, a magneto-optical disk device, a tape device, or the like. The auxiliary storage device 3005 may be a flash memory or a hard disk drive. The information processing device may store programs and data in the auxiliary storage device 3005, and may load them into the memory 3002 to use them. The auxiliary storage device 3005 may be used as the storage unit 1104 in FIG. 11.

The medium drive device 3006 drives a portable recording medium 3009, and accesses recorded content thereof. The portable recording medium 3009 is a memory device, a flexible disk, an optical disk, a magneto-optical disk, or the like. The portable recording medium 3009 may be a compact disk read only memory (CD-ROM), a digital versatile disk (DVD), a universal serial bus (USB) memory, or the like. The operator or the user may store programs and data in the portable recording medium 3009, and may load them into the memory 3002 to use them.

As described above, a computer-readable recording medium for storing the programs and data to be used for processing is a physical (non-transitory) recording medium such as the memory 3002, the auxiliary storage device 3005, or the portable recording medium 3009.

The network connection device 3007 is a communication interface circuit that is connected to the communication network 1004 and performs data conversion associated with communication. The information processing device may receive programs and data from an external device via the network connection device 3007, and may load them into the memory 3002 to use them. The network connection device 3007 may be used as the communication unit 1103 in FIG. 11.

Note that the information processing device does not necessarily include all the constituent elements in FIG. 30, and some constituent elements may be omitted depending on the use or conditions. For example, in a case where an interface with the user or the operator is not needed, the input device 3003 and the output device 3004 may be omitted. In a case where the information processing device does not use the portable recording medium 3009, the medium drive device 3006 may be omitted.

The information processing device of FIG. 30 may also be used as the DB server 1003-$j$ in FIG. 10.

While the disclosed embodiment and the advantages thereof have been described in detail, those skilled in the art will be able to make various modifications, additions, and omissions without departing from the scope of the embodiment as explicitly set forth in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing control device comprising:
a memory; and
a processor coupled to the memory and configured to:
determine, on a basis of a processing rate of an image processing program to be deployed, a type of transfer data extracted from video at a time of transferring the video to be processed by the image processing program to be deployed to be a moving image or a still image; and
select, on a basis of the type of the transfer data, a deployment destination information processing device to which the image processing program to be deployed is deployed from among a plurality of information processing devices.

2. The image processing control device according to claim 1, wherein the processor determines the type of the transfer data to be the moving image in a case where the processing rate is higher than a threshold value, and determines the type of the transfer data to be the still image in a case where the processing rate is lower than the threshold value.

3. The image processing control device according to claim 2, wherein the processor uses transfer data volume per image in a case of transferring a plurality of images included in a predetermined time range of the video as the still image and transfer data volume per unit time in a case of transferring the plurality of images as the moving image to calculate an image rate of the still image that corresponds to the transfer data volume per unit time, and uses the image rate as the threshold value.

4. The image processing control device according to claim 1, wherein the processor selects, as the deployment destination information processing device, an information processing device to which the image processing program that processes the video is deployed from among the plurality of information processing devices.

5. The image processing control device according to claim 4, wherein in a case where the type of the transfer data is determined to be the moving image, the processor selects, as the deployment destination information processing device, the information processing device to which the video is transferred as the moving image from among the information processing devices in which the image processing program that processes the video is deployed.

6. The image processing control device according to claim 4, wherein in a case where the type of the transfer data is determined to be the still image, the processor selects, as the deployment destination information processing device, the information processing device that satisfies a constraint condition related to the processing rate of the image processing program to be deployed from among the information processing devices in which the image processing program that processes the video is deployed.

7. The image processing control device according to claim 6, wherein in a case where a transfer rate of data input to the deployment destination information processing device is higher than a predetermined value after the image processing program to be deployed is deployed to the deployment destination information processing device, the processor changes the type of the transfer data from the still image to the moving image, and selects another information processing device to which the image processing program to be deployed is redeployed.

8. The image processing control device according to claim 4, wherein in a case where the type of the transfer data is determined to be the moving image and there is no single information processing device that satisfies a constraint condition related to a processing resource of the image processing program to be deployed, the processor selects, as the deployment destination information processing device, each of the plurality of information processing devices to which the video is transferred as the moving image from among the information processing devices in which the image processing program that processes the video is deployed.

9. The image processing control device according to claim 4, wherein in a case where the type of the transfer data is determined to be the still image and there is no single information processing device that satisfies a constraint condition related to a processing resource of the image processing program to be deployed, the processor selects, as the deployment destination information processing device, each of the plurality of information processing devices that satisfies a constraint condition related to the processing rate of the image processing program to be deployed from among the information processing devices in which the image processing program that processes the video is deployed, and determines an image rate of the still image to be transferred to the deployment destination information processing device depending on a processing resource of the deployment destination information processing device.

10. The image processing control device according to claim 1, wherein the processor selects, as the deployment destination information processing device, the information processing device that satisfies a constraint condition related to a data transfer time and a processing time of the image processing program to be deployed.

11. The image processing control device according to claim 1, wherein the processor selects, as the deployment destination information processing device, the information processing device that satisfies a constraint condition related to a processing resource of the image processing program to be deployed.

12. A non-transitory computer-readable recording medium storing an image processing control program which causes a computer to execute a processing of:
determining, on a basis of a processing rate of an image processing program to be deployed, a type of transfer data extracted from video at a time of transferring the video to be processed by the image processing program to be deployed to be a moving image or a still image; and
selecting, on a basis of the type of the transfer data, a deployment destination information processing device to which the image processing program to be deployed is deployed from among a plurality of information processing devices.

13. The non-transitory computer-readable recording medium according to claim 12, further comprising:
determining the type of the transfer data to be the moving image in a case where the processing rate is higher than a threshold value; and
determining the type of the transfer data to be the still image in a case where the processing rate is lower than the threshold value.

14. An image processing control method comprising:
determining, on a basis of a processing rate of an image processing program to be deployed, a type of transfer data extracted from video at a time of transferring the video to be processed by the image processing program to be deployed to be a moving image or a still image; and
selecting, on a basis of the type of the transfer data, a deployment destination information processing device to which the image processing program to be deployed is deployed from among a plurality of information processing devices.

15. The image processing control method according to claim 14, further comprising:
determining the type of the transfer data to be the moving image in a case where the processing rate is higher than a threshold value; and
determining the type of the transfer data to be the still image in a case where the processing rate is lower than the threshold value.

* * * * *